(12) United States Patent
Gust et al.

(10) Patent No.: US 11,206,759 B2
(45) Date of Patent: Dec. 28, 2021

(54) MOWER QUICK HEIGHT OF CUT ADJUSTMENT

(71) Applicant: The Toro Company, Bloomington, MN (US)

(72) Inventors: Jackie Ray Gust, Northfield, MN (US); Miguel Angel Pizano, Eden Prairie, MN (US); Chris Allen Wadzinski, Inner Grove Heights, MN (US); John R. Van Beek, Savage, MN (US); Kevin T. Conry, Deephaven, MN (US)

(73) Assignee: The Toro Company, Bloomington, MN (US)

( * ) Notice: Subject to any disclaimer, the term of this patent is extended or adjusted under 35 U.S.C. 154(b) by 333 days.

(21) Appl. No.: 16/197,215

(22) Filed: Nov. 20, 2018

(65) Prior Publication Data

US 2019/0150359 A1 May 23, 2019

Related U.S. Application Data

(60) Provisional application No. 62/589,406, filed on Nov. 21, 2017.

(51) Int. Cl.
*A01D 34/74* (2006.01)
*A01D 34/66* (2006.01)
(Continued)

(52) U.S. Cl.
CPC ............. *A01D 34/74* (2013.01); *A01D 34/54* (2013.01); *A01D 34/662* (2013.01);
(Continued)

(58) Field of Classification Search
CPC ...... A01D 34/662; A01D 34/54; A01D 34/74; A01D 34/863; A01D 34/006; A01D 34/64;
(Continued)

(56) References Cited

U.S. PATENT DOCUMENTS 1,167,400 A 1/1916 Gobiet
2,332,892 A 10/1943 Clemson
(Continued)

FOREIGN PATENT DOCUMENTS

CN 204443106 7/2015
CN 105409427 A * 3/2016 ............. A01D 34/00
(Continued)

OTHER PUBLICATIONS

Anaheim Automation, Nov. 2012, Motion Control Made Easy, Linear Actuation Guide.*
(Continued)

*Primary Examiner* — Adam J Behrens
(74) *Attorney, Agent, or Firm* — Pauly, DeVries Smith & Deffner LLC

(57) ABSTRACT

A mower comprising a vehicle, a plurality of cutting assemblies, and an automatic height of cut control system is described. In some aspects, the automatic height of cut control system is configured to automatically change the height of cut for the plurality of cutting assemblies while maintaining the attitude of each cutting blade as the blade moves from a first height of cut to a second height of cut. In some aspects, the cutting assemblies include a variable-length member linked to a four-bar linkage configured to cause a change in the height of cut in response to a change in length of the variable-length member.

15 Claims, 17 Drawing Sheets

(51) Int. Cl.
*A01D 34/86* (2006.01)
*A01D 34/54* (2006.01)
A01D 34/64 (2006.01)
A01D 34/00 (2006.01)

(52) U.S. Cl.
CPC .......... *A01D 34/863* (2013.01); *A01D 34/006* (2013.01); *A01D 34/64* (2013.01); *A01D 2034/645* (2013.01)

(58) Field of Classification Search
CPC ................ A01D 34/661; A01D 34/001; A01D 2034/645
See application file for complete search history.

(56) References Cited

U.S. PATENT DOCUMENTS

| | | | |
|---|---|---|---|
| 2,388,165 A | 10/1945 | Loewe et al. | |
| 2,915,318 A | 12/1959 | Chesser | |
| 2,986,402 A | 5/1961 | Winton | |
| 3,142,950 A | 8/1964 | West | |
| 3,217,479 A | 11/1965 | Robinson et al. | |
| 3,267,654 A | 8/1966 | Hanson et al. | |
| 3,269,100 A | 8/1966 | Smith | |
| 3,334,911 A | 8/1967 | Enters | |
| 3,357,715 A | 12/1967 | Plamper et al. | |
| 3,396,519 A | 8/1968 | Lehman | |
| 3,594,016 A | 7/1971 | Henningsen | |
| 3,677,574 A | 7/1972 | Cyr | |
| 3,696,594 A | 10/1972 | Freimuth et al. | |
| 3,706,186 A | 12/1972 | Hurlburt et al. | |
| 3,874,151 A | 4/1975 | Seifert et al. | |
| 3,955,344 A | 5/1976 | Sorensen et al. | |
| 3,958,400 A | 5/1976 | Sorensen et al. | |
| 3,972,160 A | 8/1976 | Boswell | |
| 4,006,580 A * | 2/1977 | Kalleicher | A01D 34/74 56/17.2 |
| 4,021,996 A | 5/1977 | Bartlett et al. | |
| 4,167,093 A | 9/1979 | Pfeiffer et al. | |
| 4,321,784 A | 3/1982 | Wood et al. | |
| 4,368,609 A | 1/1983 | Hutchinson et al. | |
| 4,441,306 A * | 4/1984 | Kuhn | A01D 34/74 56/15.9 |
| 4,481,757 A | 11/1984 | Tsuchiya | |
| 4,835,952 A | 6/1989 | Mclane | |
| 4,840,020 A | 6/1989 | Oka | |
| 4,899,523 A | 2/1990 | Frumholtz et al. | |
| 4,905,463 A | 3/1990 | Eilles | |
| 4,947,630 A | 8/1990 | Rich et al. | |
| 4,970,848 A | 11/1990 | Neuerburg et al. | |
| 5,065,568 A * | 11/1991 | Braun | A01D 34/64 56/14.9 |
| 5,187,925 A | 2/1993 | Patterson et al. | |
| 5,193,330 A | 3/1993 | Nusser | |
| 5,197,267 A | 3/1993 | Aldred et al. | |
| 5,209,050 A | 5/1993 | Carrigan | |
| 5,230,208 A | 7/1993 | Hess et al. | |
| 5,363,633 A | 11/1994 | Masaru | |
| 5,394,678 A | 3/1995 | Lonn et al. | |
| RE34,946 E | 5/1995 | Weaver et al. | |
| 5,526,633 A | 6/1996 | Strong et al. | |
| 5,606,851 A | 3/1997 | Bruener et al. | |
| 5,628,169 A | 5/1997 | Stiller et al. | |
| 5,661,959 A | 9/1997 | Vargas | |
| 5,797,252 A * | 8/1998 | Goman | A01D 34/74 56/17.2 |
| 5,813,203 A | 9/1998 | Peter | |
| 5,927,055 A * | 7/1999 | Ferree | A01D 34/662 56/15.9 |
| 6,044,637 A | 4/2000 | Thier et al. | |
| 6,109,009 A | 8/2000 | Benson | |
| 6,116,007 A | 9/2000 | Eggena et al. | |
| 6,212,863 B1 | 4/2001 | Thomas | |
| 6,230,089 B1 | 5/2001 | Lonn et al. | |
| 6,334,630 B1 | 1/2002 | Barros, Sr. | |
| 6,339,918 B1 | 1/2002 | Thomas | |
| 6,347,502 B1 | 2/2002 | Devries | |
| 6,351,929 B1 * | 3/2002 | Gust | A01D 75/30 56/7 |
| 6,378,280 B1 | 4/2002 | Bone et al. | |
| 6,484,481 B1 * | 11/2002 | Langworthy | A01D 69/02 56/6 |
| 6,487,837 B1 | 12/2002 | Fillman et al. | |
| 6,584,756 B2 | 7/2003 | Buss | |
| 6,609,356 B2 | 8/2003 | Fackrell et al. | |
| 6,732,500 B1 | 5/2004 | Myers | |
| 6,892,517 B2 | 5/2005 | Adams et al. | |
| 7,089,722 B2 | 8/2006 | Laskowski | |
| 7,114,318 B2 | 10/2006 | Poulson et al. | |
| 7,395,648 B1 | 7/2008 | Silbernagel et al. | |
| 7,540,135 B2 | 6/2009 | Strope | |
| 7,614,207 B2 | 11/2009 | Elhardt et al. | |
| 7,624,560 B1 | 12/2009 | Humphrey | |
| 7,658,056 B2 | 2/2010 | Thompson et al. | |
| 7,669,395 B2 | 3/2010 | Wehler et al. | |
| 7,716,907 B2 * | 5/2010 | Joliff | A01D 34/74 56/17.2 |
| 7,726,109 B2 | 6/2010 | Thompson et al. | |
| 7,775,025 B1 | 8/2010 | Coffin et al. | |
| 7,788,892 B2 | 9/2010 | Schmidt et al. | |
| 7,958,707 B2 | 6/2011 | Thompson et al. | |
| 8,069,639 B2 | 12/2011 | Fancher | |
| 8,119,533 B2 | 2/2012 | Liu et al. | |
| 8,166,737 B2 | 5/2012 | Ninomiya et al. | |
| 8,225,587 B2 | 7/2012 | Wilson et al. | |
| 8,256,198 B2 | 9/2012 | Thompson | |
| 8,261,521 B2 | 9/2012 | Thompson | |
| 8,297,032 B2 | 10/2012 | Ninomiya et al. | |
| 8,333,058 B2 | 12/2012 | Thompson et al. | |
| 8,347,593 B2 | 1/2013 | Ito et al. | |
| 8,511,049 B2 | 8/2013 | Thompson et al. | |
| 8,621,833 B2 | 1/2014 | Shida et al. | |
| 8,635,962 B2 | 1/2014 | Schilling | |
| 8,776,513 B2 | 7/2014 | Nishioka | |
| 8,839,598 B2 | 9/2014 | Shida et al. | |
| 8,857,145 B2 | 10/2014 | Volovsek | |
| 9,021,776 B2 | 5/2015 | Zwieg et al. | |
| 9,301,444 B2 * | 4/2016 | Campbell | A01D 34/82 |
| 9,635,809 B2 | 5/2017 | Iyasere et al. | |
| 2003/0110752 A1 | 6/2003 | Dow | |
| 2003/0140611 A1 | 7/2003 | Burke | |
| 2004/0216436 A1 | 11/2004 | Schmidt et al. | |
| 2004/0216438 A1 | 11/2004 | Poulson et al. | |
| 2005/0257508 A1 | 11/2005 | Modzik et al. | |
| 2006/0070365 A1 | 4/2006 | Laskowski | |
| 2007/0007200 A1 | 1/2007 | Slater et al. | |
| 2007/0107404 A1 | 5/2007 | Hickenbottom et al. | |
| 2007/0234697 A1 | 10/2007 | Silbernagel et al. | |
| 2007/0234698 A1 | 10/2007 | Silbernagel et al. | |
| 2008/0072556 A1 * | 3/2008 | Tegtmeier | A01D 75/306 56/7 |
| 2009/0107096 A1 | 4/2009 | Thompson et al. | |
| 2009/0188225 A1 | 7/2009 | Harris | |
| 2010/0313538 A1 | 12/2010 | Coleman et al. | |
| 2014/0331630 A1 | 11/2014 | Phillips et al. | |
| 2016/0316619 A1 | 11/2016 | Johanek et al. | |
| 2017/0034996 A1 | 2/2017 | Kruckeberg et al. | |
| 2018/0235146 A1 * | 8/2018 | Hashimoto | A01D 34/78 |
| 2019/0124836 A1 * | 5/2019 | Aposhian | A01D 34/74 |
| 2019/0150360 A1 * | 5/2019 | Aposhian | A01D 34/66 |

FOREIGN PATENT DOCUMENTS

| | | | |
|---|---|---|---|
| DE | 1061554 | 7/1959 | |
| DE | 19534695 | 3/1997 | |
| DE | 102008056046 | 5/2010 | |
| DE | 102008056047 | 5/2010 | |
| DE | 202010007832 | 8/2010 | |
| DE | 202010007832 * | 9/2010 | .......... A01D 34/412 |
| DE | 202010007832 U1 | 9/2010 | |
| DE | 102013012529 | 1/2015 | |
| DE | 102015207684 | 11/2015 | |

(56) References Cited

FOREIGN PATENT DOCUMENTS

| | | |
|---|---|---|
| DE | 102016207400 | 11/2016 |
| EP | 0211785 | 2/1987 |
| EP | 0271672 | 6/1988 |
| EP | 0361573 | 4/1990 |
| EP | 0525402 | 2/1993 |
| EP | 0552000 | 7/1993 |
| EP | 0642731 | 3/1995 |
| EP | 0861581 | 9/1998 |
| EP | 1095553 | 5/2001 |
| EP | 1647176 | 4/2006 |
| EP | 1321022 | 1/2008 |
| EP | 2529614 | 7/2013 |
| FR | 546899 | 11/1922 |
| FR | 2865889 | 5/2007 |
| FR | 2923349 | 5/2009 |
| GB | 1049726 | 11/1966 |
| GB | 1241751 | 8/1971 |
| GB | 2282950 | 4/1995 |
| GB | 2328359 | 9/2002 |
| GB | 2367475 | 4/2004 |
| WO | 0060921 | 10/2000 |
| WO | 2013009325 | 1/2013 |
| WO | 2013158003 | 10/2013 |
| WO | 2016206908 | 12/2016 |
| WO | 2019104190 | 5/2019 |

OTHER PUBLICATIONS

"Adjusting Height-of-Cut Rotary Deck (HOC)," Deere 7400A Height of Cut Instructions 2013, retrieved from <http://manuals.deere.com/omview/OMTCU35098_19/OUMX068,0000544_19_20140119.html> (2 pages).

"Gm2810 5-Deck Rotary Mower Parts Catalog," Baroness by Kyoeisha Co., Ltd. at least as early as Sep. 11, 2017 (58 pages).

"No-tool notch adjustment system makes height-of-cut changes a breeze," Deere 8800 No Tool HOC Instructions, Sales Manual, Nov. 5, 2010 (2 pages).

"Quick Adjust Cutting Units," by John Deere retrieved from URL <https://www.deere.com/en_US/industry/golf/learn_more/feature/2010/quick_adjust_cutting_units.page> at least as early as Aug. 23, 2017 (1 page).

"Reel Mower Basics Toro University Technical Training Manual," printed at least as early as Sep. 19, 2017 (60 pages).

"Rotary Mower Basics Toro University Technical Training Manual," printed at least as early as Sep. 19, 2017 (28 pages).

"Safety Operation & Maintenance Manual," Ransomes Jacobsen for Models Jacobsen AR3, Kubota K1105-E4B and E3B Height of Cut Adjustments pp. 52-54 (84 pages).

"International Search Report and Written Opinion," for PCT Application No. PCT/US2018/062278 dated Mar. 6, 2019 (13 pages).

"International Preliminary Report on Patentability," for PCT Application No. PCT/US2018/062278 dated Jun. 4, 2020 (8 pages).

* cited by examiner

MOWER QUICK HEIGHT OF CUT ADJUSTMENT

This application claims the benefit of U.S. Provisional Application No. 62/589,406, filed Nov. 21, 2017, the contents of which are herein incorporated by reference.

BACKGROUND

Mowers with multiple cutting decks allow an operator to mow a large area in a shorter amount of time, especially for contoured terrain. When changing the height of cut for the cutting decks, it is cumbersome and time consuming to manually change the height of cut for each cutting deck individually.

SUMMARY

Some aspects of the present disclosure provide a mower including a vehicle, a plurality of cutting assemblies, and an automatic control system. In some examples, each cutting assembly is connected to the vehicle and capable of being driven by the vehicle. Each cutting assembly has a carrier frame with a plurality of ground-engaging rotatable members, including at least one front rotatable member and at least one rear rotatable member. The plurality of ground-engaging rotatable members define a reference plane.

In some aspects, each cutting assembly has a cutting unit with at least one cutting blade. The cutting unit is positioned in a spatial relationship with the carrier frame in which movement of the cutting unit with respect to the carrier frame defines a height of cut. The cutting unit has an attitude with respect to the reference plane. The automatic control system has an operator interface module operable to receive operator input indicating a target height of cut. The automatic control system is configured to automatically move each of the cutting units with respect to each respective carrier frame based on the operator input. In some examples, each cutting unit is configured to maintain its attitude with respect to the reference plane as the cutting unit is moved from a first height of cut to a second height of cut.

In some aspects, each cutting assembly further includes a four-bar linkage between the cutting unit and the carrier frame. In some aspects, the four-bar linkage includes a side link, a first crank assembly and a second crank assembly, each crank assembly having a pivot attached to the carrier frame. The mower may also include a first arm pivotably attached to the cutting unit. The mower may also include a second arm pivotably attached to the side link. In some aspects, each cutting assembly further includes a first four-bar linkage connecting a first side of the cutting unit to a first side of the carrier frame, and a second four-bar linkage connecting a second side of the cutting unit to a second side of the carrier frame.

In some aspects, the mower further including a linear actuator connected to the cutting unit, the linear actuator configured to cause the movement from the first height of cut to the second height of cut in response to a change in length of the linear actuator. In some aspects, each cutting assembly further includes a four-bar linkage between the cutting unit and the carrier frame, the four-bar linkage including a first crank assembly and a second crank assembly, and a connector member pivotably connected to the linear actuator, the connector member being linked to one of first crank assembly and the second crank assembly.

In some aspects, the operator interface module is positioned within 1.5 meter (4.9 feet) of an operator seat of the vehicle.

In some aspects, the plurality of cutting assemblies includes three cutting assemblies. In some aspects, each cutting assembly further includes a cutting blade drive system operably connected to the at least one cutting blade, where the automatic control system is further configured to receive a signal indicating a current height of cut for each of the plurality of cutting assemblies and, if a current height of cut is not equal to the target height of cut for each cutting assembly, prevent all of the cutting blade drive systems from operating.

Some aspects of the present disclosure provide a mower including a vehicle, a plurality of cutting assemblies operably connected to the vehicle and capable of being driven by the vehicle, and a height of cut control system. In some examples, each cutting assembly has a carrier frame with a plurality of ground-engaging rotatable members configured to follow a ground surface, and a cutting unit connected to the carrier frame. Each cutting assembly further has a four-bar linkage connecting the cutting unit to the carrier frame and a variable-length member having a first end linked to the cutting unit and a second end linked to the four-bar linkage. The cutting unit has at least one cutting blade. Each cutting assembly is configured to cause movement of the cutting unit in relation to the carrier frame in response to a change in length of the variable-length member. The height of cut control system is capable of moving each of the cutting units with respect to each respective carrier frame to move the cutting units from a first height of cut to a second height of cut.

In some aspects, each of the ground-engaging rotatable members are independent of the vehicle.

In some aspects, the mower includes an operator interface module operable to receive operator input indicating a target height of cut, the operator interface module operably connected to the height of cut control system and configured to cause the height of cut control system to automatically move each of the plurality of cutting units with respect to each respective carrier frame based on the operator input.

In some aspects, the plurality of ground-engaging rotatable members of each carrier frame define a reference plane, where each cutting unit has an attitude with respect to the reference plane of each respective carrier frame, where each cutting unit is configured to maintain the attitude with respect to the reference plane of each respective carrier frame as the cutting unit is moved from the first height of cut to the second height of cut.

In some aspects, the mower further including a height of cut indicator including a gauge located on the cutting unit, the gauge including markings indicating a plurality of heights of cut of the cutting unit, and a pointer located on the four-bar linkage, the pointer configured to move with respect to the gauge as the four-bar linkage moves in relation to the cutting unit, where the pointer indicates the height of cut position of the cutting unit and the markings are visible from above the cutting unit.

In some aspects, a variable-length member includes a motor-driven linear actuator.

Some aspects of the present disclosure provide a mower that includes a vehicle, a plurality of cutting assemblies operably connected to and capable of being driven by the vehicle, and an automatic control system. In some examples, each cutting assembly has a carrier frame with a plurality of ground-engaging rotatable members including at least one front rotatable member and at least one rear rotatable member. The plurality of ground-engaging rotatable members defining a reference plane. Each cutting assembly further includes a cutting unit with at least one blade. At least a portion of the cutting unit including the at least one blade is rotatable around a substantially vertical axis. The cutting blade has an attitude with respect to the reference plane. The cutting unit is positioned in a spatial relationship with the carrier frame in which movement of the cutting unit with respect to the carrier frame defines a height of cut. The automatic control system includes an operator interface module that can receive operator input indicating a target height of cut. The automatic control system can automatically move each of the plurality of cutting units with respect to each respective carrier frame based on the operator input. Each cutting unit is configured to maintain the blade attitude with respect to the reference plane of each respective carrier frame as the cutting unit is moved from a first height of cut to a second height of cut.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense.

Figure 1:
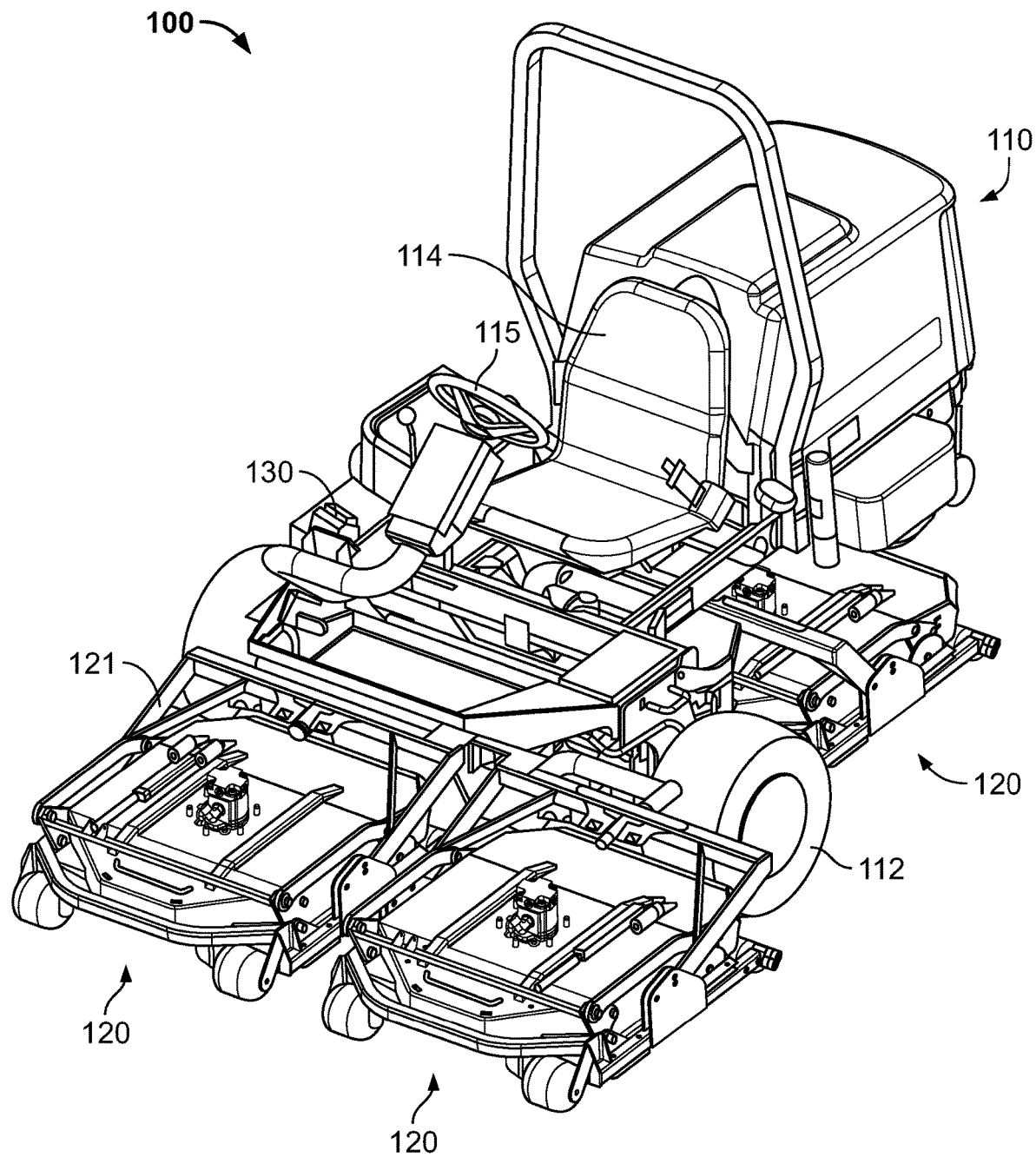
FIG. 1 is a front perspective view of a mower according to some examples.

While embodiments herein are susceptible to various modifications and alternative forms, specifics thereof have been shown by way of example and drawings, and will be described in detail. It should be understood, however, that the scope herein is not limited to the particular examples described. On the contrary, the intention is to cover modifications, equivalents, and alternatives falling within the spirit and scope herein.

DETAILED DESCRIPTION

The technology described relates to mowers with multiple cutting decks. An operator of a multiple-deck mower sometimes needs to change the cutting height of multiple cutting decks, also referred to as cutting assemblies. For example, it is common for a golf course to have at least three different height of cut requirements for different types of turf at the golf course. In one example, an automatic height of cut adjustment system allows an operator to press a button and simultaneously change the height of cut for multiple cutting decks. This system can be implemented in a rotary mower, a reel mower, a disc mower, a flail mower, or other types of mower, though it is illustrated herein as used in a rotary mower. The operator inputs a target height of cut for the cutting decks, then the automatic adjustment system sends a signal to each of the cutting decks to change the height of cut. In some examples, the automatic adjustment for each of the multiple cutting decks is performed simultaneously. By "simultaneously change", "simultaneously adjust," or "performed simultaneously", as the phrases are used herein, it is intended that the cutting units are moving at approximately the same time, whether or not they start moving at exactly the same time or finish moving at exactly the same time. In some examples, a change of height of cut is initiated by an operator pressing a button on an operator interface module.

In some examples, each cutting deck has a four-bar linkage that raises and lowers the cutting deck. The four-bar linkage is actuated by a variable-length member. The variable-length member may be automatically actuated. Examples of an automatically-actuated, variable-length member include an electronic or hydraulic linear actuator. The variable-length member may alternatively be a manually-driven, variable-length member. An example of a manually-driven, variable-length member includes a draw bolt that can be turned by a tool such as a wrench or a drill to extend and retract the member. Lengthening or shortening the variable-length member causes the four-bar linkage to correspondingly raise or lower the cutting deck. This changes the height of cut of the cutting deck. The four-bar linkage is configured to raise and lower the cutting deck with respect to a reference plane, such as a level ground surface, without changing the attitude of the cutting blade. In other words, raising and lowering the cutting deck does not cause the cutting blade to change its degree of tilt.

In some examples, it is possible to change between an automatically-actuated height of cut adjustment system and a manually-driven height of cut adjustment system. For example, a mower sold with a manually-driven height of cut adjustment system can be upgraded to have an automatically-actuated height of cut adjustment system by adding an electronic or hydraulic linear actuator and removing the manually-driven variable-length member. In another example, a mower having an automatically-actuated height of cut adjustment system can be switched over to a manually-driven variable-length member for any reason, such as if there is a need to repair the automatically-actuated height of cut adjustment system.

Figure 2:
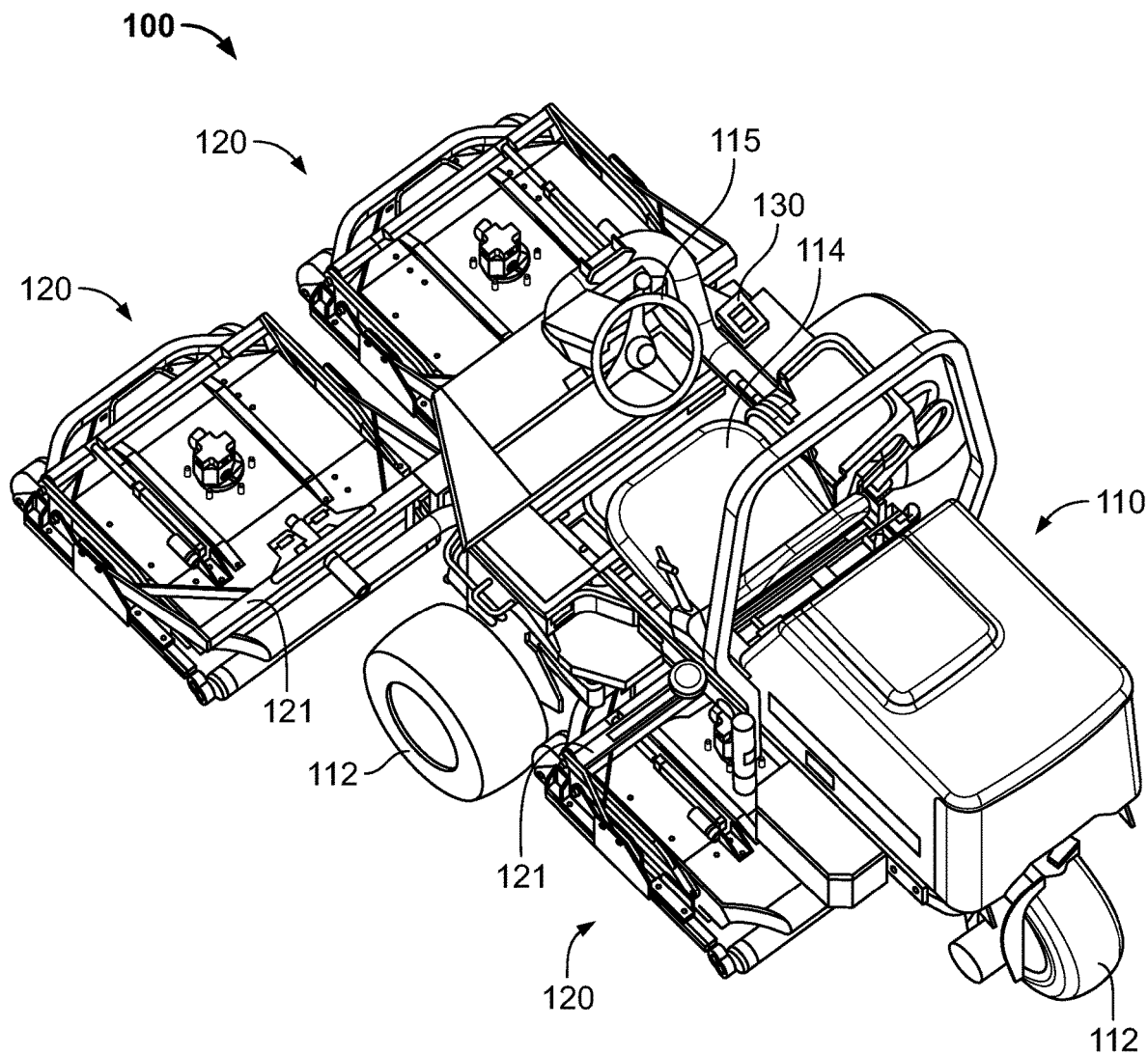
FIG. 2 is a rear perspective view of the mower of FIG. 1.

FIGS. 1-2 show a mower according to some examples. The mower 100 includes a vehicle 110 operably connected by one or more cutting assembly connectors 121 to a plurality of cutting assemblies 120. In the example of FIGS. 1 and 2, the vehicle 110 is a traction vehicle having wheels, an engine, and a control system. The vehicle 110 rides on a plurality of wheels 112. In the example of FIGS. 1 and 2, the vehicle 110 has three wheels 112, but in alternative examples the vehicle can have four or more wheels.

Although the examples provided in the drawings show a traction vehicle, other configurations are possible and within the scope of the described technology. For example, in alternative embodiments, the vehicle could be a pull-behind mowing assembly. In some examples, the vehicle can be a pull-behind trailer with a plurality of ground-engaging wheels. The wheels contact the ground independently of the cutting assemblies. The vehicle provides a frame on which the cutting assemblies are secured. Some examples can include a hitch assembly to connect the vehicle to a locomotion unit that drives the vehicle, for example a tractor that tows the pull-behind vehicle. A pull-behind vehicle can be powered or unpowered. An unpowered pull-behind vehicle may have an electrical cable that connects to the locomotion unit. Alternatively, the vehicle can have its own power source independent of the locomotion unit. Alternatively, the vehicle can be a push-ahead mowing assembly with features similar to a pull-behind mowing assembly, but designed to be pushed in front of a locomotion unit.

The mower 100 provides an operator seat 114 and operator controls, such as a steering wheel 115. The vehicle 110 further includes many additional internal and external elements, such as an engine, transmission, etc. (not shown).

The mower 100 is provided with multiple cutting assemblies 120. In the example of FIGS. 1-2, the mower 100 is provided with three cutting assemblies 120. In alternative examples, the mower 100 could be provided with fewer cutting assemblies or more cutting assemblies, such as two cutting assemblies, five cutting assemblies or seven cutting assemblies. In the example of FIGS. 1-2, the cutting assemblies 120 are substantially similar to each other.

In the example of FIGS. 1-2, the cutting assemblies 120 are rotary mower cutting assemblies, each having a blade that rotates around a substantially vertical axis. In alternative examples, the cutting assemblies could incorporate a reel cutting unit, a disc cutting unit, a flail cutting unit, or another type of cutting unit instead of a rotary cutting assembly.

The controls provided to the operator of the mower 100 include controls for an automatic height of cut adjustment system. The controls can include an operator interface module 130 for controlling the automatic height of cut adjustment system. In one example, the operator interface module 130 is positioned so that an operator within a typical size range can have the operator interface module 130 within arm's reach when sitting in the operator seat 114. The seat 114 may be provided with an adjustable seat distance from the controls, and the distance of the operator interface module 130 from the seat 114 therefore depends upon the seat position chosen by the operator of the mower 100. In some examples, the operator interface module 130 is positionable to accommodate operators of different heights. For example, the operator interface module 130 can be positioned so that it can be approximately within 0.5 meter (1.6 feet), 1.0 meter (3.3 feet), 1.5 meters (4.9 feet), or 2.0 meters (6.6 feet) of one of the seat positions.

The operator interface module 130 allows an operator to input a target height of cut for the cutting assemblies 120. For example, the operator may input a desired target height of cut of 1.5 inches. In response, the automatic height of cut adjustment system adjusts the cutting assemblies 120 for cutting at the target height. The height of cut adjustment system will be discussed further below.

In some embodiments, the controls allow the operator of the mower to move the cutting assemblies between a ground-engaging, cutting position, as shown in the Figures, and a disengaged, raised position for transport or maintenance.

Cutting Assembly

Figure 3:
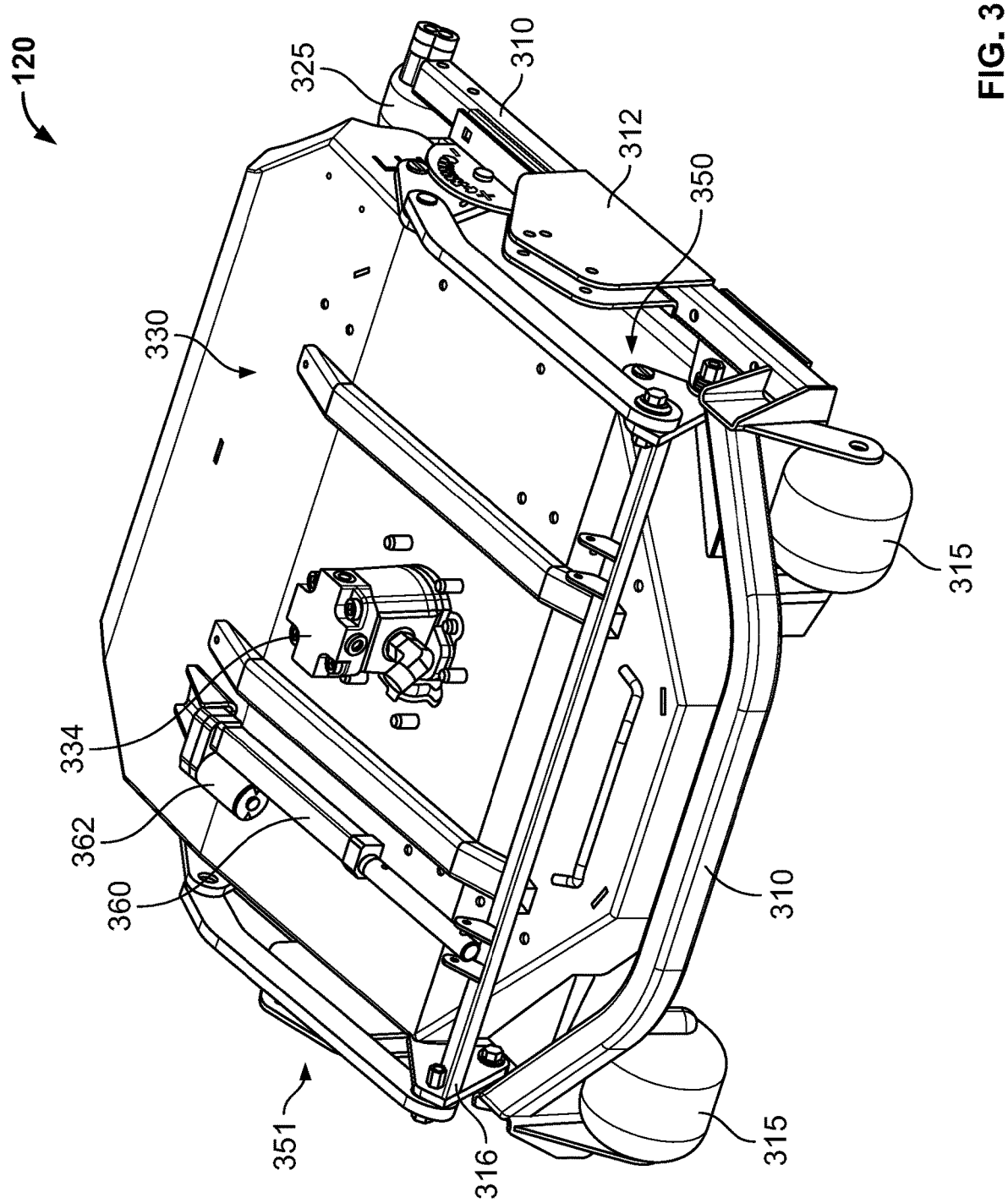
FIG. 3 is a perspective view of a cutting assembly according to some examples, including the mower of FIGS. 1 & 2.
Figure 4:
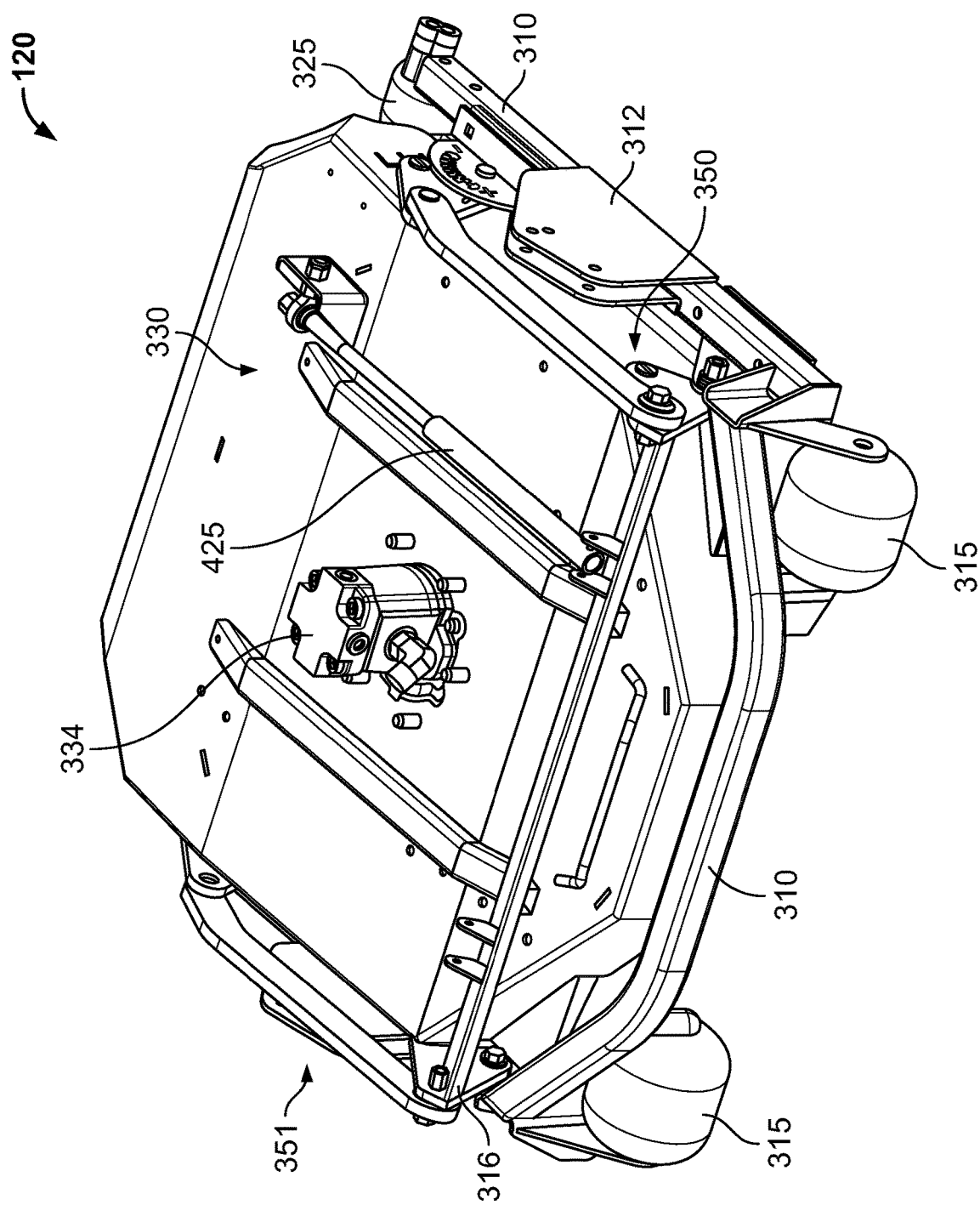
FIG. 4 is a perspective view of the cutting assembly with a manual actuator.

FIGS. 3-4 show a cutting assembly 120 according to some examples. As seen in FIG. 3, the cutting assembly 120 includes a carrier frame 310 with a plurality of ground-engaging, rotatable members, including two front rotatable members 315 and a rear rotatable member 325, such as two front wheels 315 and an elongated rear roller 325. The carrier frame 310 has brackets 312 configured to couple with the cutting assembly connectors 121 of FIG. 1, which then allows the vehicle 110 to drive the cutting assembly 120.

The carrier frame 310 serves as a structural support for cutting unit 330. The cutting unit has a spatial relationship with the carrier frame 310 such that a change in the position of cutting unit 330 with respect to the carrier frame 310 results in a change in the height of cut for the cutting assembly 120.

The cutting assembly 120 further includes at least one four-bar linkage connecting the carrier frame 310 and the cutting unit 330. The at least one four-bar linkage provides the movement of the cutting unit 330 in relation to the carrier frame 310. As used herein, a link refers to a connecting piece in the moving parts of a machine. A linkage is a mechanism that transfers motion using a combination of links, pivots, and rotating members.

In the example of FIG. 3, the cutting assembly 120 includes a first four-bar linkage 350 and a second four-bar linkage 351 on the opposite side of the cutting assembly 120. The first four-bar linkage 350 and the second four-bar linkage 351 are linked to a variable-length member 360 and to each other by a connector member 316, which is a transverse member spanning the width of the cutting assembly 120. The variable-length member 360 is pivotably connected to the cutting unit 330 and to the connector member 316.

In the example of FIG. 3, the variable-length member 360 is an electronically controlled linear actuator. In an alternative example provided in FIG. 4, a variable-length member is a manually controlled actuator 425. As will be discussed further below, a change in the length of the variable-length member 360 causes the height of cut of the cutting assembly 120 to change.

In the examples shown in the Figures, a rotary cutting unit is present in each cutting assembly. In alternative examples, the cutting assemblies could incorporate a reel cutting unit, a disc cutting unit, a flail cutting unit, or another type of cutting unit instead of a rotary mower.

Elements of Cutting Assembly

Carrier Frame

Figure 5:
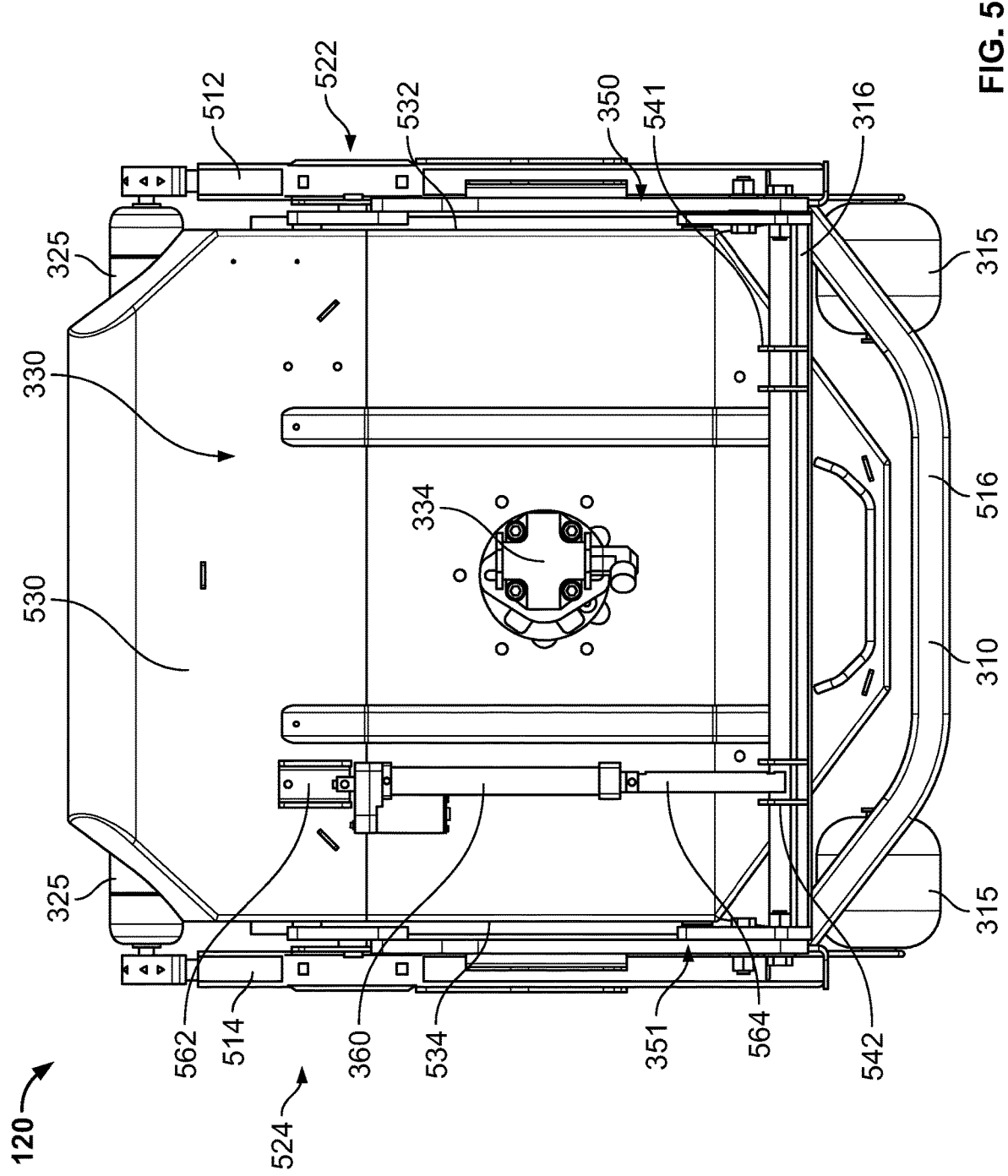
FIG. 5 is a top view of the cutting assembly of FIG. 3.

FIG. 5 is a top view of the cutting assembly 120. As seen from above, the carrier frame 310 has a first side frame member 512 and a second side frame member 514 connected by a front frame member 516. The first side frame member 512 defines a first side 522 of the cutting assembly 120, and the second side frame member 514 defines a second side 524 of the cutting assembly 120.

Figure 10:
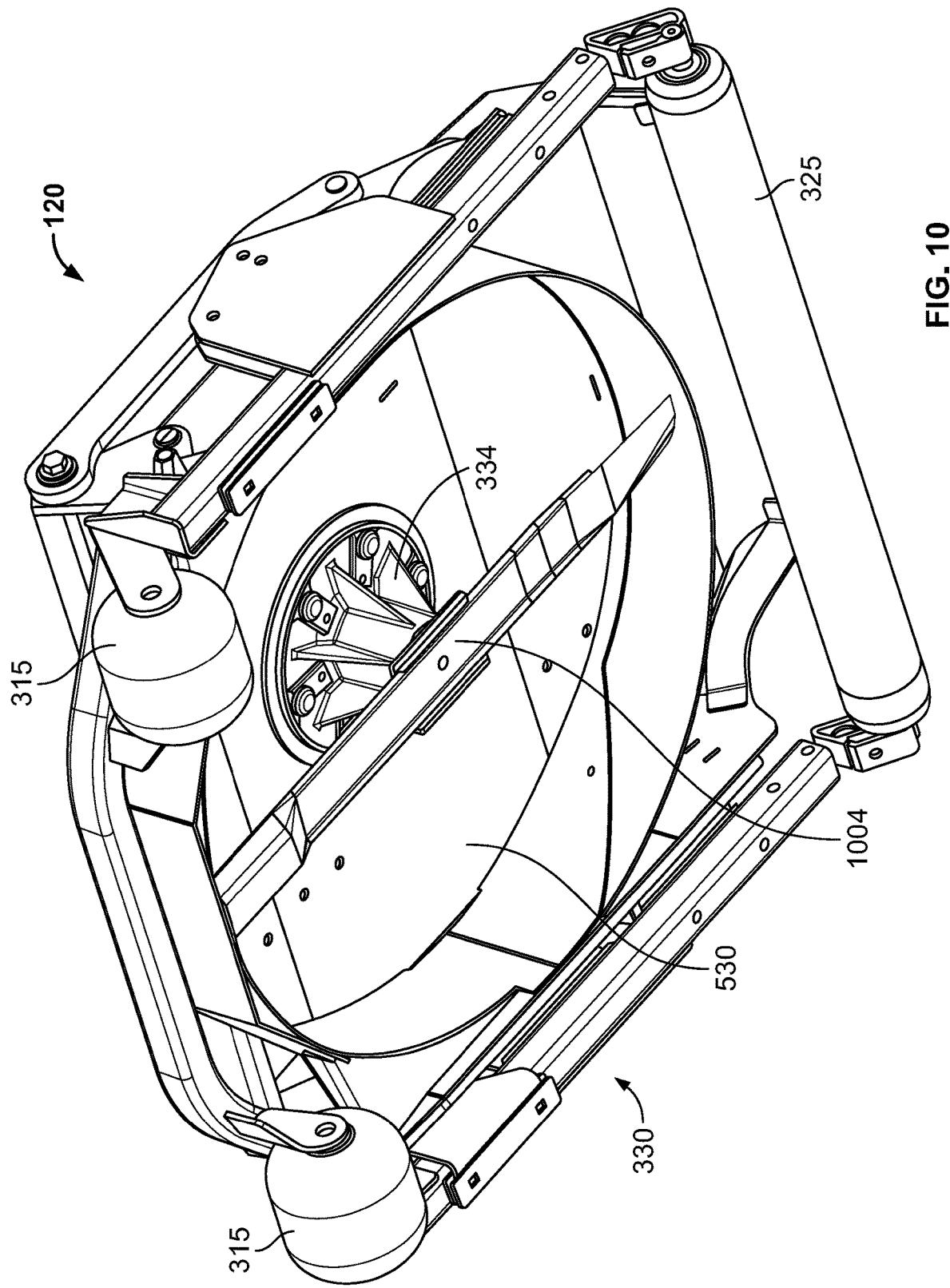
FIG. 10 is a perspective view of the underside of the cutting assembly, showing a cutting unit.

The carrier frame has a plurality of ground-engaging rotatable members. In the example of FIG. 5, the carrier frame 310 has three ground-engaging rotatable members: a front roller or wheel 315 attached to the first side member 512, a front roller or wheel 315 attached to the second side member 514, and a single elongated roller 325 located at the rear portion of the cutting assembly 120. The elongated roller 325 (seen more clearly in FIG. 10) spans the width of the carrier frame 310, and is connected to both the first side frame member 512 and the second side frame member 514. Thus, in the example of FIG. 5, the carrier frame support is defined by the rigid, fixed connections between the first and second side members 512, 514, the front frame member 516 and the elongated roller 325.

In another arrangement, the carrier frame 310 can include four wheels or rollers, with one wheel or roller attached at each of the corners of the carrier frame or two elongated rollers. In another arrangement, the carrier frame 310 can include a front elongated roller and a rear elongated roller.

In the examples of the Figures, the carrier frame includes a plurality of ground-engaging rotatable members that are independent from the wheels 112 of the vehicle 110. The carrier frame of each cutting assembly is driven by the vehicle and includes ground-engaging, rotatable members that follow the ground independently of the wheels 112 of the vehicle.

Connector Member and Variable-Length Member

FIG. 5 further shows the connector member 316 that spans the width of the cutting assembly 120. The variable-length member 360 has a first end 562 pivotably connected to the cutting unit 330, and a second end 564 pivotably connected to the connector member 316. In particular, in the example of FIG. 5, the second end 564 of the variable-length member 360 is pivotably attached to a bracket 542. For example, a bracket 542 having two axially spaced openings and a pin joint can be used to connect the second end 564 of the variable-length member 360 to the connecting member 316. At the attachment location of the first end 562 of the connecting member 360 to the cutting unit 330, the cutting unit defines openings 566 to facilitate attachment.

In one example, a pair of mirrored attachment structures for a variable-length member 360 are provided by the cutting assembly 330. For example, the connector member 316 has a pair of brackets including a first bracket 541 and a second bracket 542. The brackets 541, 542 are configured to pivotably connect the variable-length member 360 to the connector member 316. In some examples, such as the example of FIG. 5, the brackets 541, 542 are equally spaced from the center of the cutting unit 330. Other examples may have brackets that are not equally spaced from the center of the cutting unit. In some examples, both of the brackets are positioned to one side of the center of the cutting unit. In some examples, the cutting unit 330 defines a mirrored pair of openings 566, 567 to facilitate attachment of the first end 562 of the variable-length member 360 at two location options on the cutting unit 330.

Although the examples shown in the Figures show the brackets bolted to the cutting unit, in alternative embodiments the brackets could be welded to the cutting unit or integrally formed with the cutting unit.

The variable-length member 360 can be, for example, an automatically-driven, variable-length member, such as an electronic or hydraulic linear actuator. In one example, the automatically-driven, variable-length member is a motor-driven linear actuator, such as an electric motor-driven linear actuator. In the examples of FIGS. 1-3 and 5-12, the variable-length member 360 is an electronic linear actuator which includes a motor 362 that drives an internal worm gear to extend and retract the end 564 of the member 360.

An automatically-driven, variable-length member 360 is controlled by the operator interface module 130. For example, an electric cable may connect the operator interface module 130 to the automatically driven actuator 360. Alternatively, the actuator 360 and the operator interface module 130 may be in wireless communication, or in wireless communication via a smart phone. In another example, the variable-length member 360 is a hydraulic linear actuator that is controlled by using hydraulic lines.

The variable-length member 360 incorporates a height-of-cut sensor, in various examples, that can provide information to an operator interface module or controller about the amount of extension of the variable-length member. The information about the amount of extension is used to calculate the height of cut at a moment in time for the cutting assembly. The height-of-cut sensor may be, for example, a linear or rotational potentiometer incorporated into the variable-length member or elsewhere on the cutting assembly. In one example, a linear potentiometer measures the relative displacement of two points on the variable-length member, which provides information corresponding to the change in length of the variable-length member 360.

In alternative examples, the height-of-cut sensor can be a Hall effect sensor arrangement. In one example, a magnetic portion of the variable-length member produces a known magnetic field and is positioned to have a varying distance from one or more transducers as the member extends and retracts. The transducers vary in output voltage based on a distance from the magnetic portion. The output voltage of the Hall effect sensor is communicated to a controller, which uses that information to calculate the height of cut at a moment in time for the cutting assembly. There are many other options for providing a height-of-cut information to the controller, including rotational potentiometer located on one of the crank assemblies, Hall effect sensors outside of the variable-length member, optical sensors, and mechanical switch sensors.

The variable-length member 360 can be a manually-driven, variable-length member 425, as shown in FIG. 4, couplable to the connecting member 316 at either bracket 541 or bracket 542 and couplable to the cutting unit 330 at openings 566 or openings 567. A tool may be used to adjust the length of a manually-driven, variable-length member, in some embodiments. The manually-driven, variable-length member 425 can include, for example, a draw bolt. An operator can use a tool such as a wrench or rotating drill to rotate the draw bolt using bolt head 430, which lengthens or shortens the variable-length member 425 to the desired position to adjust the height of cut. A manually-driven, variable-length member is typically adjusted by the operator one variable-length member at a time. In alternative examples, the variable-length member 425 could incorporate a turnbuckle or a linkage including two linear members linked together to have an adjustable amount of overlap. Other means of manually adjusting the link of the variable-length member 425 are possible and within the scope of the current technology.

In some examples, the height of cut control adjustment system can be converted between manual actuation and automatic actuation. For example, a mower sold with a manually-driven height of cut adjustment system, such as the example shown in FIG. 4, can be upgraded to have an automatically-actuated height of cut adjustment system as shown in FIG. 5. To do so, the operator adds an electronic or hydraulic linear actuator and removes the manually-driven variable-length member. When an automatically-driven actuator 360 is connected, an operator can use the operator interface module 130 to input a target height of cut, and the automatic height of cut control system will command the automatically-driven actuator 360 to move to the appropriate height of cut.

To modify a manual system shown in FIG. 4, in some examples, the operator would attach a first end 562 of an automatically-driven actuator 360 to the cutting unit housing 530 using openings 566. The operator installs the operator interface module 130 (FIGS. 1-2) and places the automatically-driven actuator 360 in communication with an operator interface module, such as by using the electrical cable or wireless communication. One or both of the variable-length members 360, 425 are adjusted to have identical lengths. The operator would then attach a second end 564 of the automatically-driven actuator 360 to the bracket 542 of the connector member 316. The operator would also disconnect the two ends of the manually-driven, variable-length member 425 from the bracket 541 by removing the pins and fasteners at each end of the member 425, and then remove the member 425. The automatically-driven actuator 360 can then be used to control the height of cut. The steps of this process can take place in many different orders other than listed. The presence of two brackets 541, 542 allows an operator to connect one variable-length member to the cutting assembly without removing the other variable-length member. This removes the need to lock the cutting assembly into a fixed height of cut position while switching between the automatically and manually driven variable-length members. If only one bracket and set of openings were present on the cutting unit, then additional steps would be taken to lock the cutting unit into a fixed height of cut position before removing the manual member 425. The height of cut position can be locked, for example, by using a mechanical locking device on the cutting assembly, placing the cutting unit on a block that holds it in a height of cut position so it does not drop, or lowering it to the lowest height of cut so it cannot drop when the manual member 425 is removed.

If the automatically-driven actuator 360 shown in FIG. 5 were to malfunction, or if the operator of the mower 100 so desires, the automatically-driven actuator 360 can be replaced with a manually-driven, variable-length member 425 shown in FIG. 4. To make this switch, in some examples, the operator would adjust the length of the manually-driven member 426 to match the length of the installed automatically-driven actuator 360. The operator would attach a first end of the manually-driven, variable-length member 425 to the cutting unit housing 530 at openings 567, and attach a second end of the manually-driven, variable-length member 425 to the bracket 541 of the connector member 316. The operator would also disconnect the second end 564 of the automatically-driven actuator 360 from the bracket 542, and remove the actuator 360. The automatic actuator 360 might be disconnected from an electronic cable connected to the operator interface module 130, or the operator interface module 130 might be detached. The manually-driven, variable-length member 425 can then be used to control the height of cut manually. The presence of two brackets 541, 542 allows an operator to connect one actuator to the cutting assembly without removing the other actuator. This removes the need to lock the cutting assembly into a fixed height of cut position while switching from the electronic to the manual actuator. Alternatively, the height of cut position can be fixed using the methods discussed herein.

It is possible for one cutting assembly to have a manually-driven variable-length member while the other cutting assemblies have an automatically-actuated variable-length member. This might occur where one automatically-driven, variable-length member malfunctions and is replaced with a manually-actuated variable-length member. In such a system, the automatic control system can be programmed to bypass the cutting assembly with the manually-driven, variable-length member.

Cutting Unit

In the examples shown in the Figures, a rotary cutting unit is present in each cutting assembly. FIG. 5 shows a top view of the rotary cutting unit 330. The cutting unit 330 includes a housing 530 with a first housing side 532 on the first side 522 of the cutting assembly 120 and a second housing side 534 on the second side 524 of the cutting assembly 120. The cutting unit 330 also includes a blade mounting and drive system 334 situated in an aperture in the housing 530. As can be seen more clearly in FIG. 10, the drive system 334 includes a substantially-vertical, rotating shaft that protrudes through the housing 530 to the underside of the cutting assembly 120. A cutting blade 1004 is operably connected to the drive system 334.

In alternative examples, the cutting assemblies could incorporate a reel cutting unit, a disc cutting unit, a flail cutting unit, or another type of cutting unit instead of a rotary mower. In some examples, the cutting assemblies could incorporate a cutting unit that rotates about a substantially horizontal axis. A reel cutting unit typically includes three main structural members: a reel including several helix shaped blades mounted to a shaft that rotates around a substantially horizontal axis; a bedknife attached to a bed bar; and a frame. The reel frame, which includes rollers, supports the bed bar assembly and reel. The bed bar assembly is mounted to the reel frame of the cutting unit such that it is possible to adjust the position and orientation of the bedknife and the reel. The frame includes a drive mechanism to cause the reel to rotate. The drive mechanism may be electric, hydraulic, belt driven, or ground driven.

A disc cutting unit cuts grass using disc quills that rotate about a substantially vertical axis. Each disc quill includes one, two, or more cutting blades attached to a central core with a swiveling connection along an attachment edge. The cutting blade can swing away if a solid object is struck, reducing the likelihood of damage to the mower.

Four-Bar Linkage

Figure 6:
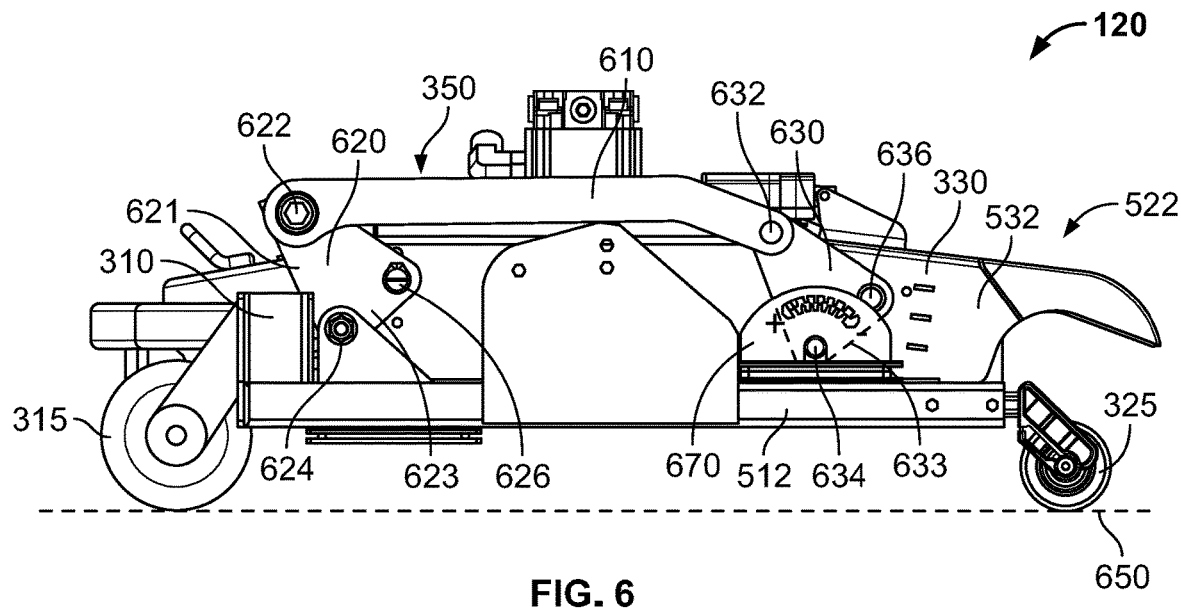
FIG. 6 is a side view of a first side of the cutting assembly of FIG. 3.

In some examples a four-bar linkage is used to adjust the height of cut. Turning to FIG. 6, the cutting assembly 120 comprises a first four-bar linkage 350 on the first side 522 of the cutting assembly 120. The first four-bar linkage 350 connects the first side member 512 of the carrier frame 310 to the first side 532 of the cutting unit housing 530. Specifically, the four-bar linkage 350 includes a side link 610 and a pair of crank assemblies, including a first bell crank 620 and a second bell crank 630. Each of the crank assemblies is pivotably attached to the carrier frame 310 at a point that is fixed with respect to the remainder of the carrier frame. Each of the crank assemblies is also pivotably attached to the cutting unit 330 and the side link 610, and rotation of the crank assembly causes those two attachments to move in space relative to the carrier frame 310. The side link 610 and the first bell crank 620 are pivotably attached at point 622; the carrier frame 310 and the first bell crank 620 are pivotably attached at point 624; and the cutting unit 330 is pivotably attached to the first bell crank 620 at point 626. Likewise, the side link 610 and the second bell crank 630 are pivotably attached at point 632; the carrier frame 310 and the second bell crank 630 are pivotably attached at point 634; and the cutting unit 330 is pivotably attached to the second bell crank 630 at point 636.

The connections at the different pivot points 622, 624, 626, 632, 634, 636 allow the parts to rotate with respect to each other without significant friction. Examples of pivoting connection structures include a bolt and nut arrangement with bushings in between each component. Other mechanical configurations are possible, such as low friction washers in combination with a bolt and nut.

The crank assemblies, including the first bell crank 620 and the second bell crank 630, act as levers that transform the substantially horizontal motion of the side links to substantially vertical motion of the cutting unit. The crank assemblies 620, 630 each have two arms. In the case of the first bell crank 620, the first arm 621 is the fixed connection between the pivot 622 and the pivot 624. The second arm 623 is the fixed connection between the pivot 624 and the pivot 626. The mechanical linkage of the first four-bar linkage assembly 350 constrains the side link 610 to substantially horizontal movement in a plane parallel to the side 522 of the cutting assembly 120. Substantially horizontal motion of the first side link 610 causes the first arm 621 to rotate about the pivot point 624 where the first bell crank 620 is pivotably attached to the carrier frame 310. This motion further causes the second arm 623 to rotate about the pivot point 624, causing the cutting unit 330 to be lowered or raised substantially vertically in relation to the carrier frame 310. This substantially vertical displacement of the cutting unit 330 causes the blade 1004 (FIG. 10) of the cutting unit 330 to likewise be lowered or raised, which changes the distance of the cutting blade 1004 from the reference plane 650, and therefore the height of cut.

The second bell crank 630 comprises a first arm and a second arm that meet at pivot point 634, and extend to pivot points 632 and 636 respectively. The two arms of each crank assembly define an angle between the two arms. In various embodiments, the angle between the two arms of the bell crank is at least about 60 degrees, or at least about 65 degrees. In various embodiments, the angle between the two arms of the bell crank is at most about 80 degrees, at most about 75 degrees, or at most about 70 degrees.

The length of each of the arms defines the arc along which the bell crank 620 travels. In some examples, the length of the bell crank arms is at least 2 inches (5.1 centimeters). In some examples, the length of the arms is between two inches and five inches, or between 5.1 and 12.7 centimeters. In some examples, the length is more than two inches (5.1 centimeters), more than 2.5 inches (6.4 centimeters), more than 3 inches (7.6 centimeters), or more than 3.5 inches (8.9 centimeters). In some examples, the length is less than 6 inches (15.2 centimeters), less than 5 inches (12.7 centimeters), or less than 4 inches (10.2 centimeters). In some examples, the first arm and the second arm have different lengths. In some examples, the bell cranks 620, 630, 720, and 730 are identical in size and shape.

In some examples, the cutting assembly includes a mechanical height of cut indicator which allows the user to see a visual indication of the height of cut of the cutting assembly. One example is a height of cut gauge 670 shown in FIG. 6, which is visible as a user is looking at the side of the cutting assembly 120 and includes markings to indicate the various heights of cut. The height of cut gauge 670 is affixed to the side member 512 of the carrier frame 310. A mark on the bell crank 630 indicates the amount of rotation of the bell crank 630 around the pivot 634. The gauge 670 is calibrated to indicate the distance of the blade 1004 from the ground reference plane 650.

Figure 7:
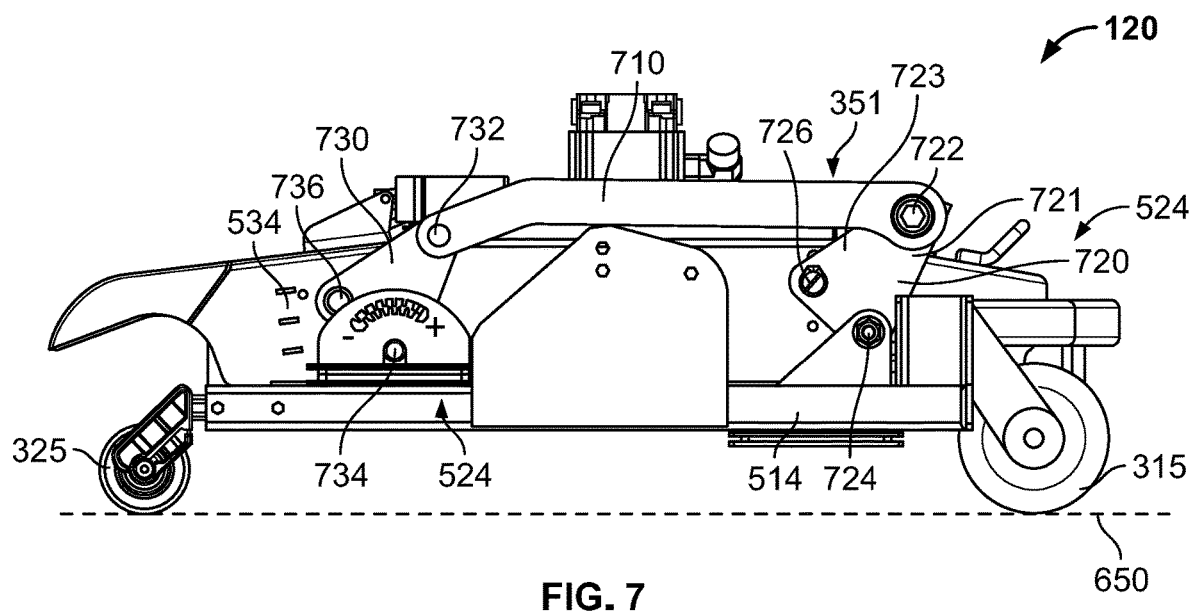
FIG. 7 is a side view of a second side of the cutting assembly of FIG. 3.

FIG. 7 shows the second side 524 of the cutting assembly 120. Like the first four-bar linkage 350, second four-bar linkage 351 connects the second side member 514 of the carrier frame 310 to the second side 534 of the cutting unit housing 530. The bell cranks 720, 730 each have two arms. In the case of the first bell crank 720, the first arm 721 is the fixed connection between the pivot 722 and the pivot 724. The second arm 723 is the fixed connection between the pivot 724 and the pivot 726. The mechanical linkage of the second four-bar linkage assembly 351 constrains the side link 710 to substantially horizontal movement in a plane parallel to the second side 524 of the cutting assembly 120. Horizontal motion of the second side link 710 causes the first arm 721 to rotate about the pivot point 724 where the first bell crank 720 is pivotably attached to the carrier frame 310. This motion further causes the second arm 723 to rotate about the pivot point 724, causing the cutting unit 330 to be lowered or raised substantially vertically in relation to the carrier frame 310. This substantially vertical displacement of the cutting unit 330 causes the blade 1004 of the cutting unit 330 to likewise be lowered or raised, which changes the distance of the cutting blade 1004 (FIG. 10) from the reference plane 650, and therefore the height of cut.

Likewise, the side link 710 and the second bell crank 730 are pivotably attached at point 732; the carrier frame 310 and the second bell crank 730 are pivotably attached at point 734; and the cutting unit 330 is pivotably attached to the second bell crank 730 at point 736.

Rollers as Reference Plane

As is depicted in FIG. 6, the front rollers 315 and the rear roller 325 are configured to engage the ground when the mower 100 is in use. The front and rear rollers 315, 325 follow the ground independently of the wheels 112 of the vehicle 110. The bottom edge of the rollers 315, 325 define a reference plane 650 that represents, approximately, the terrain of the turf to be cut. The vertical height of a blade of the cutting unit 330 in relation to the ground reference plane 650 determines the height of cut for the cutting assembly 120. Although the rollers 315 are depicted as rollers and the rear roller 325 is depicted as a single elongated roller, alternative examples are possible. For example, both the front and rear rotatable members could be elongated rollers. Alternatively, four wheels positioned at the corners of the carrier frame 310 could be used. Other alternatives are possible and within the scope of the current technology.

Connector Member Links Variable-Length Member and Four-Bar Linkages

Figure 8:
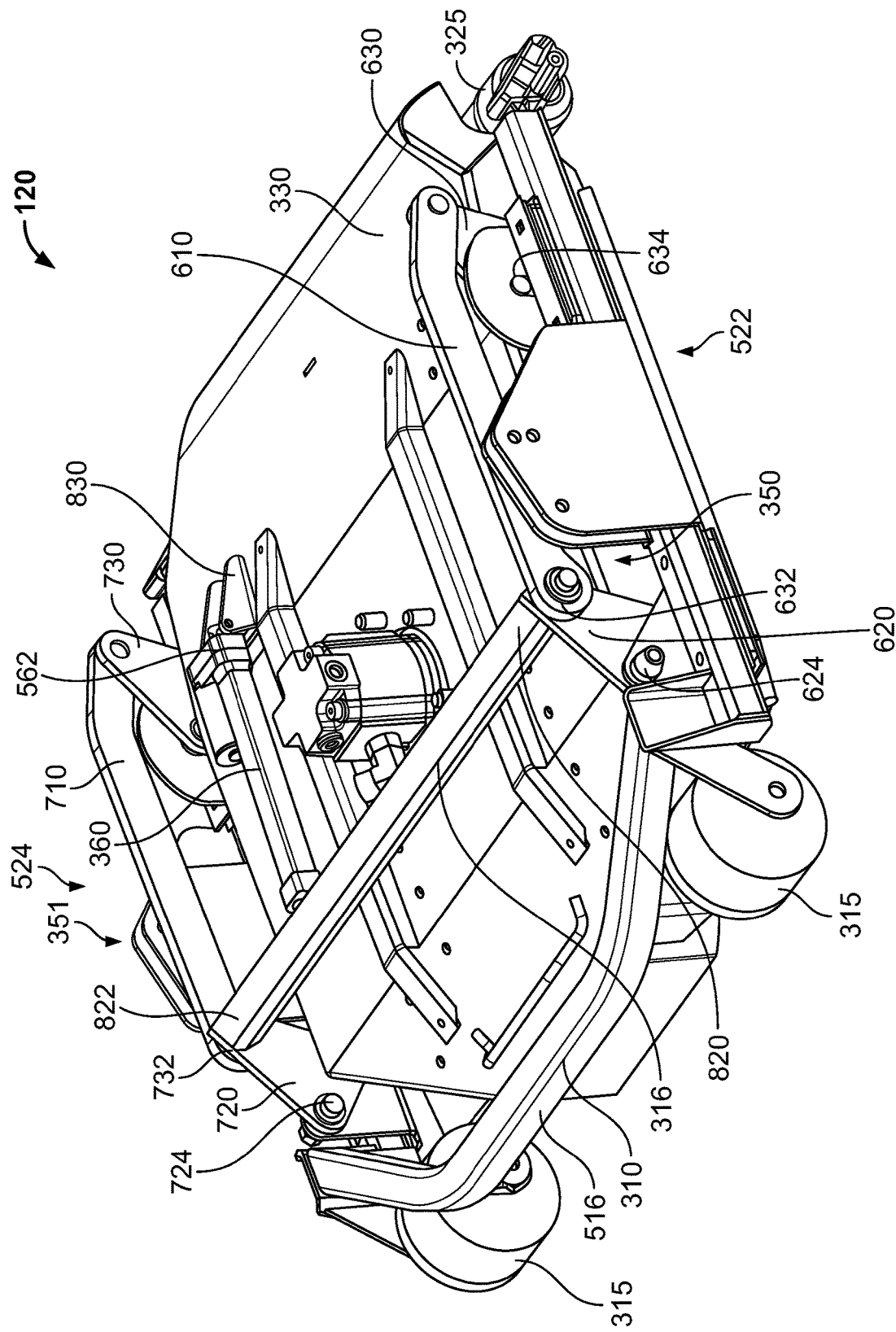
FIG. 8 is a perspective view of the cutting assembly of FIG. 3 configured for a first height of cut.
Figure 9:
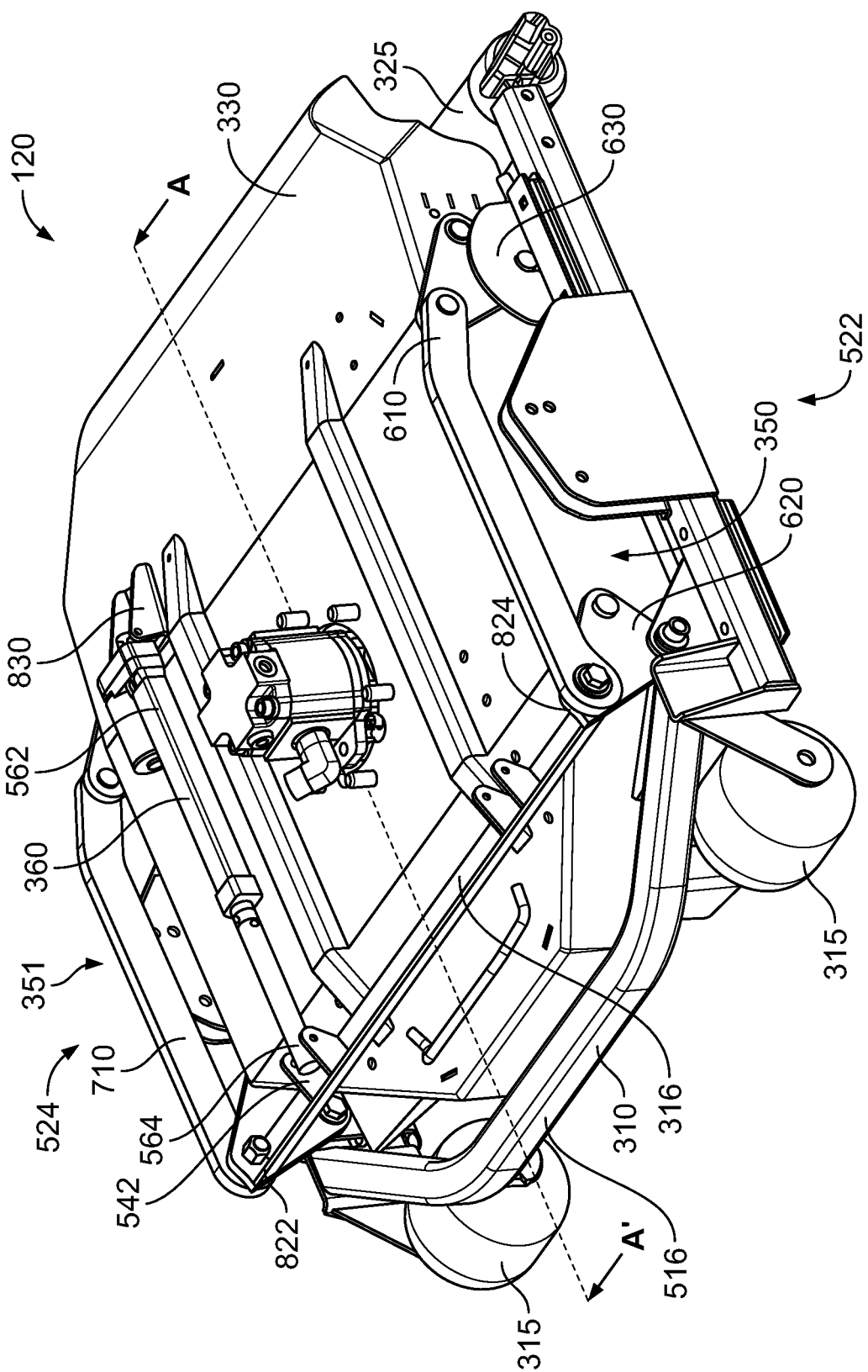
FIG. 9 is a perspective view of the cutting assembly of FIG. 3 configured for a second, higher height of cut.
Figure 11:
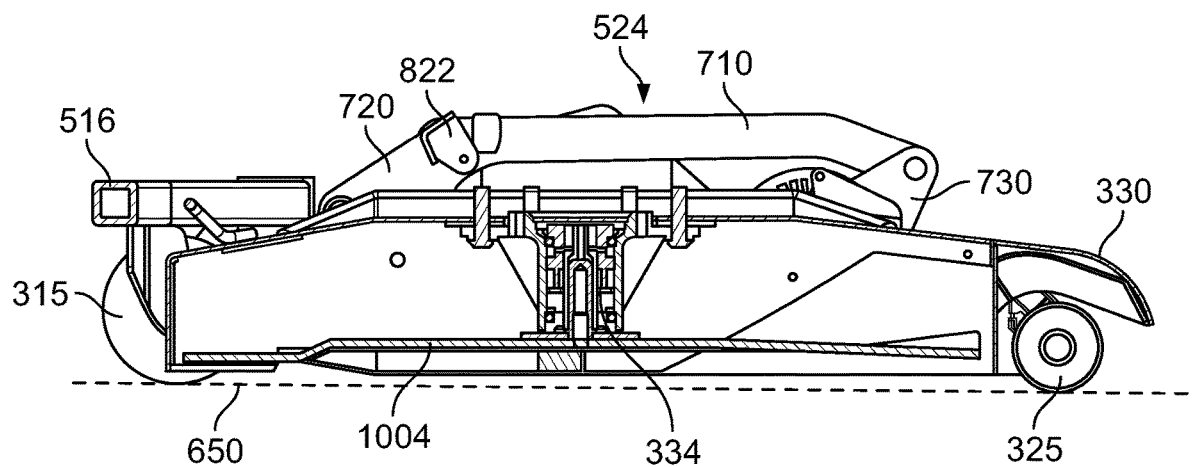
FIG. 11 is a cross-sectional view of the cutting assembly of FIG. 8 along line 11-11 in FIG. 8, configured for the first, lower height of cut.
Figure 12:
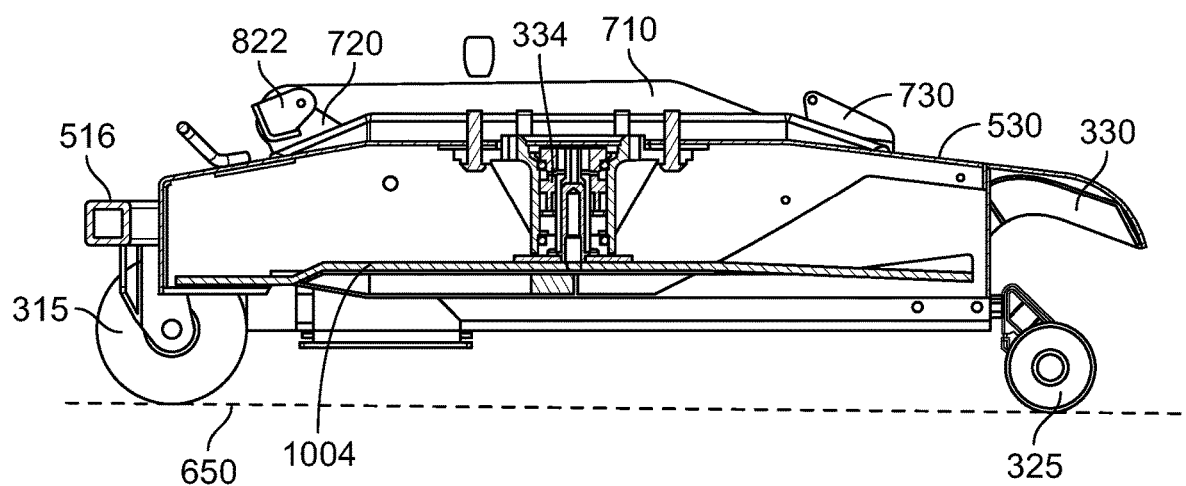
FIG. 12 is a cross-sectional view of the cutting assembly of FIG. 9 along line 12-12 in FIG. 9, configured for the second, higher height of cut.

FIGS. 8-12 demonstrate the manner in which the four-bar linkages determine the height of cut for the cutting assembly 120. FIG. 8 shows the cutting assembly 120 at a first, lower height of cut, and FIG. 9 shows the cutting assembly 120 at a second, higher height of cut. FIG. 11 is a cross-sectional view along line 11-11 in FIG. 8, showing the blade 1004 at the first, lower height of cut, H1. FIG. 12 is a cross-sectional view along line 12-12 in FIG. 9, showing the blade 1004 at the second, higher height of cut, H2.

As discussed with respect to FIG. 6, the first four-bar linkage 350 is positioned on the first side 522 of the cutting assembly 120, and the second four-bar linkage 351 is positioned on the second side 524 of the cutting assembly 120. Each of the two four-bar linkages lift or lower one side of the cutting unit 330. A connector member 316 connects variable-length member 360 to both the first four-bar linkage 350 and to the second four-bar linkage 351. In particular, in the example of FIGS. 8-12, the connector member 316 extends across the width of the cutting assembly 120. The connector member 316 is pivotably connected to the side link 610 at a first end 820 of the connector member 316, and pivotably connected to the side link 710 at a second end 822 of the connector member 316. The connector member 316 is pivotably connected to the variable-length member 360 at the bracket 542. In some examples, the connector member 316 can be integrally formed with or welded to the bell crank 620 and the bell crank 720. In this case, the two bell cranks 620, 720 are fixed in relation to and do not pivot with respect to the connector member 316. As the bell cranks 620, 720 rotate about the pivot points 624 and 724 respectively, causing points 622 and 722 to travel along an arc, the connecting member 316 travels that same arc.

FIG. 8 shows the variable-length member 360 with a first, shorter length at a first, lower height of cut, and FIG. 9 shows the variable-length member 360 with a second, longer length at a second, higher height of cut.

The length of the variable-length member 360 may be controlled by an automatic height of cut adjustment system or by manual adjustment of a manually-driven variable-length member, such as member 425 in FIG. 4. As the length of the variable-length member 360 or 425 changes from a first length to a second length, the second end 564 of the variable-length member acts upon the connector member 316, which transfers the movement of the variable-length member to both the bell crank 620 and the bell crank 720. In the example of FIGS. 8-11, as the length of the variable-length member 360 becomes shorter, the connector member 316 acts upon the side links 610 and 710 to urge the side links 610, 710 toward the rear of the cutting assembly 120, that is, toward the rear roller 325. In turn, this causes the bell cranks 620, 630, 720, and 730 to pivot at the pivot points 624, 634, 724, and 734 respectively. As previously discussed with respect to FIG. 6, the arm 623 of the bell crank 620 then rotates about the pivot 624, causing the housing 532 to change its vertical height with respect to the carrier frame 310. The other bell cranks 630, 720, 730 pivot in a corresponding manner. When the length of the variable-length member 360 increases, the side links 610, 710 are urged toward the front member 516 of the carrier frame 310, causing the bell cranks 620, 630, 720, and 730 to pivot in the opposite direction, increasing the height of cut.

The first end 562 of the variable-length member 360 includes an attachment structure 830 which is used to attach the variable-length member to openings 566 (FIG. 4) of the cutting unit 330.

Height of Cut Indicator

Figure 14:
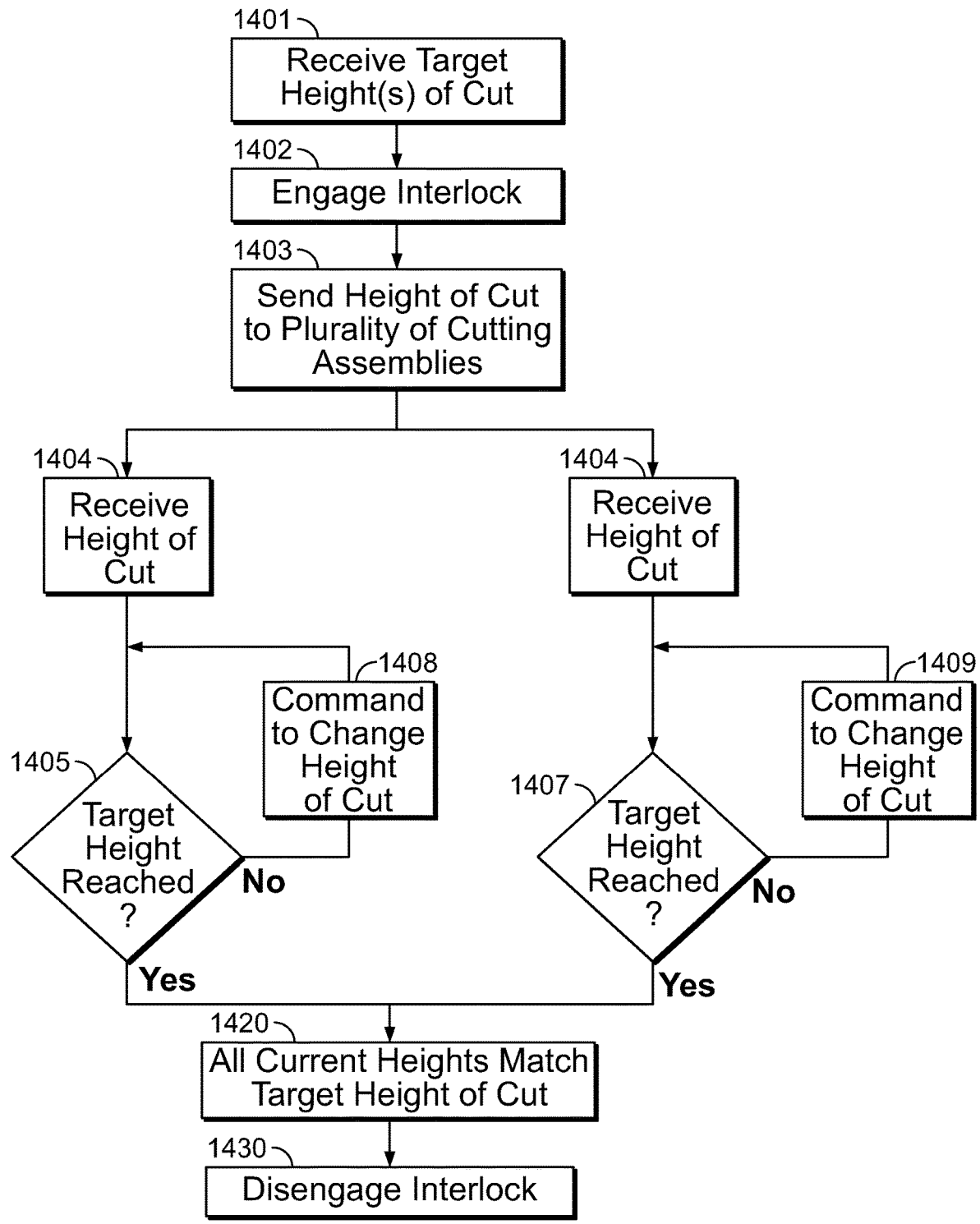
FIG. 14 is a flowchart demonstrating a method for the automatic height of cut control system.
Figure 15:
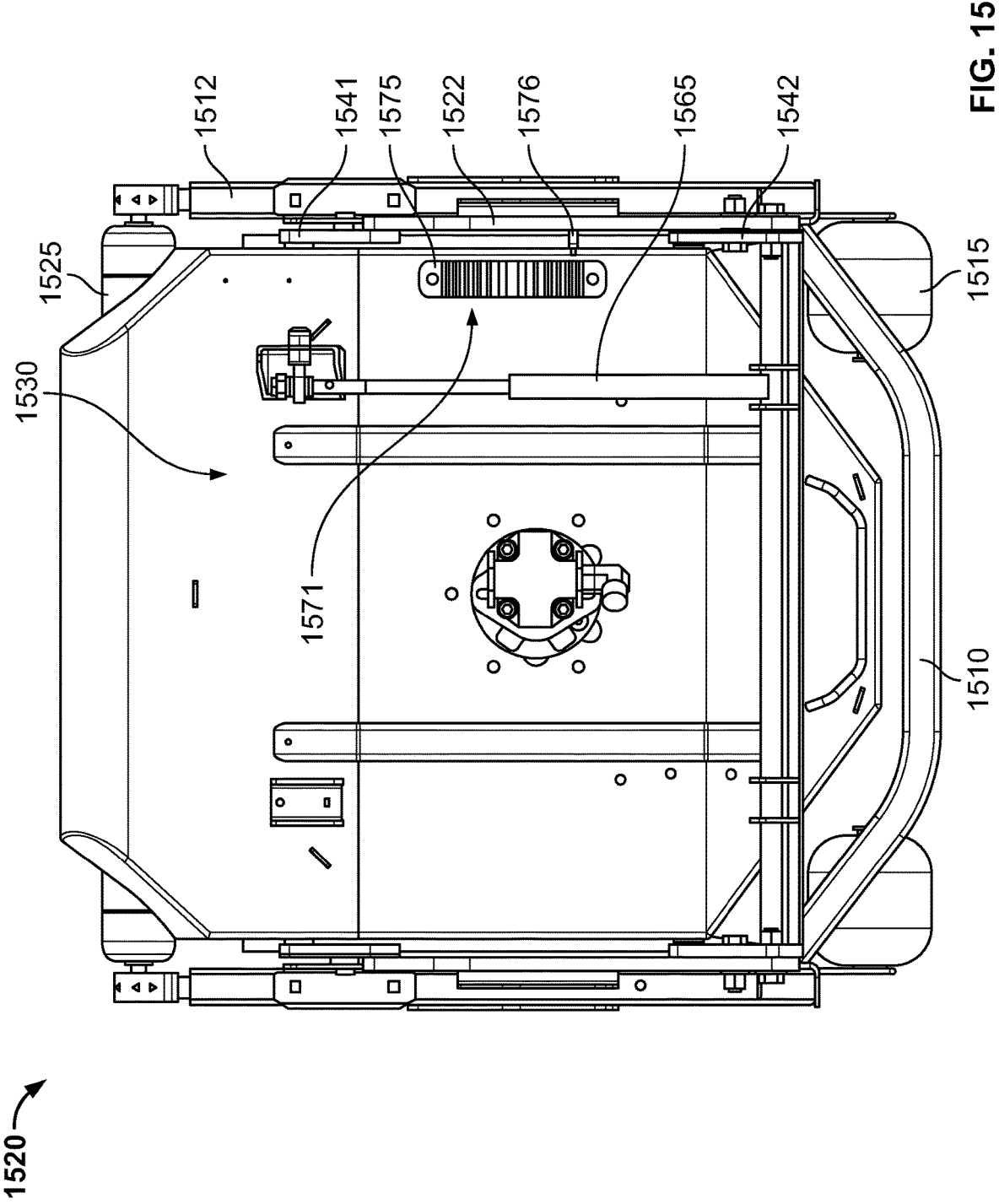
FIG. 15 is a top view of a cutting assembly having a height of cut indicator.
Figure 16:
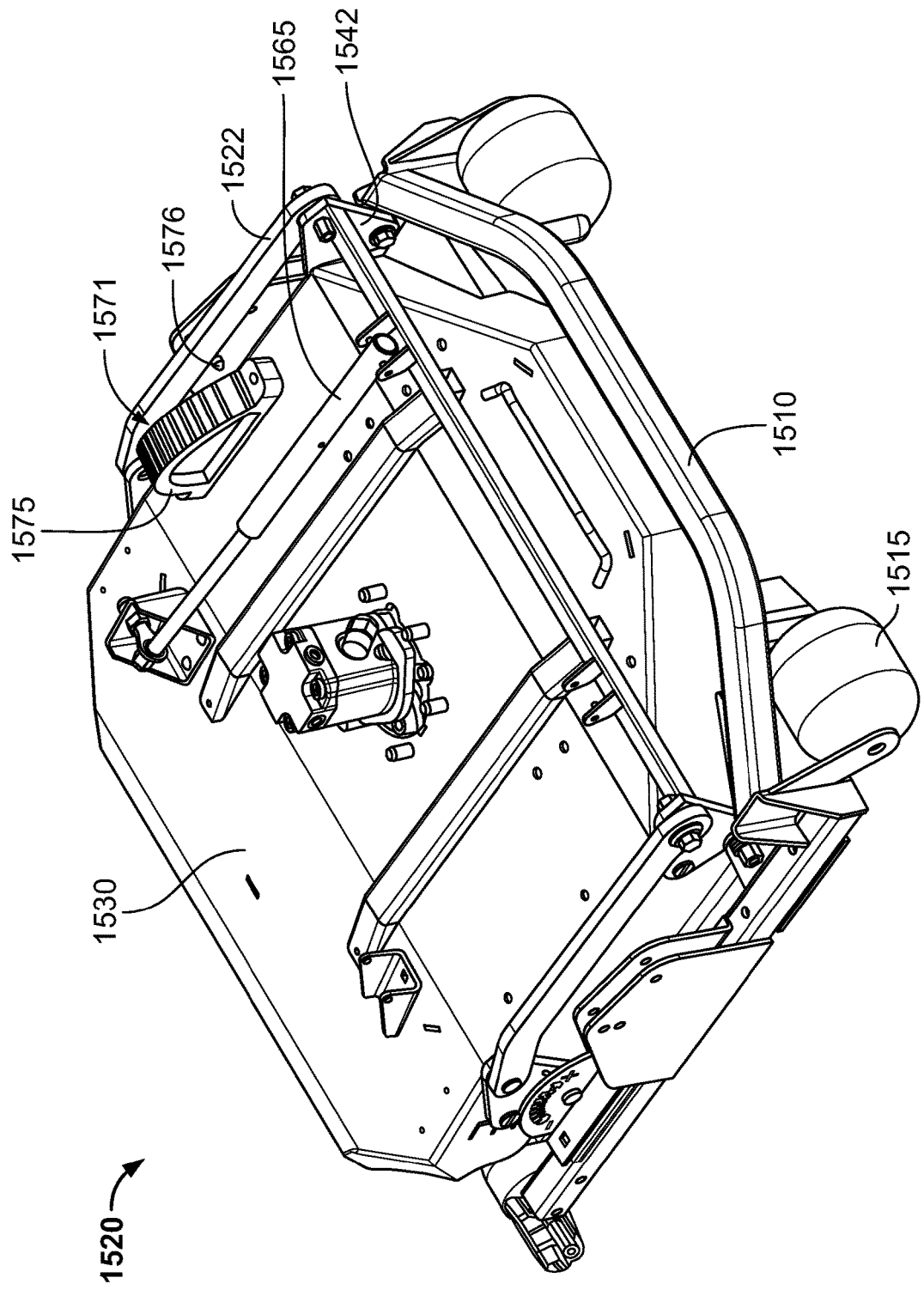
FIG. 16 is a perspective view of the cutting assembly of FIG. 15.

FIGS. 15 and 16 show an example of a height of cut indicator gauge that can be used with the cutting assembly described herein, where a visual indication of the height of cut is visible to a user looking down from above a cutting assembly. FIG. 15 is a top view of a cutting assembly 1520 having a height of cut indicator 1570, and FIG. 16 is a perspective view of the cutting assembly 1520 of FIG. 15. Turning to FIG. 15, a cutting assembly 1520 is shown. The cutting assembly 1520 may be similar to the cutting assembly 120 as shown in relation to FIGS. 1-14. The cutting assembly can be used with the vehicle 110. The cutting assembly 1520 includes a carrier frame 1510 with a plurality of ground-engaging, rotatable members, including two front rotatable members 1515 and a rear rotatable member 1525. The carrier frame 1510 serves as a structural support for cutting unit 1530. The cutting unit 1530 has a spatial relationship with the carrier frame 1510 such that a change in the position of cutting unit 1530 with respect to the carrier frame 1510 results in a change in the height of cut for the cutting assembly 1520.

The cutting assembly 1520 further includes at least one four-bar linkage connecting the carrier frame 1510 and the cutting unit 1530. The at least one four-bar linkage provides the movement of the cutting unit 1530 in relation to the carrier frame 1510. In the example of FIGS. 15-16, the cutting assembly 1520 includes a variable-length member 1565, which is a manually controlled actuator similar to actuator 425 of FIG. 4. A change in the length of the variable-length member 1565 causes the height of cut of the cutting assembly 1520 to change. It is also possible for the height of cut indicator 1570 to be provided on a cutting assembly having an automatically actuated movement between heights of cut.

As seen from above in FIG. 15, the carrier frame 1510 has a side frame member 1512. A four-bar linkage connects the side member 1512 of the carrier frame 1510 to the side of the cutting unit housing. Specifically, the four-bar linkage includes a side link 1522 and a pair of bell cranks, including a first bell crank 1541 and a second bell crank 1542. Each of the bell cranks is pivotably attached to the carrier frame 1510 at a point that is fixed with respect to the remainder of the carrier frame. Each of the bell cranks is also pivotably attached to the cutting unit 1530 and the side link 1522, and rotation of the bell cranks causes those two attachments to move in space relative to the carrier frame 1510.

The height of cut indicator 1570 includes a gauge 1571 located on a top surface of the cutting unit 1530 and a pointer 1576 located on the four-bar linkage. The gauge 1571 includes markings 1572 indicating a plurality of heights of cut of the cutting unit 1530. A pointer 1576 located on the side link 1522 is configured to move with respect to the gauge 1571 as the side link 1522 moves in relation to the cutting unit 1330. The pointer 1576 points to the current height of cut of the cutting unit 1530.

In some examples, the pointer 1576 and the markings 1572 of the gauge 1571 are visible from above. This allows an operator to see the current height of cut setting for the cutting assembly 1520 while viewing the height of cut indicator 1570 from above. In one example, an operator can see the markings 1572 and the pointer 1576 while using a tool to adjust the variable-length member 1565. When the length of the variable-length member 1565 changes, the side link 1522 travels along an arc dictated by the mechanical configuration of the four-bar linkage. The pointer 1576 also travels along this arc. As seen more clearly in FIG. 16, the gauge 1571 is arc-shaped along its top edge. In some examples, the pointer 1576 is positioned along the side of the markings 1572. In some examples, the pointer 1576 is positioned above the markings 1576. In some examples, the shape of the gauge 1571 is such that the pointer 1576 is approximately the same vertical distance above the markings 1572 as the pointer 1576 travels through the arc dictated by the four-bar linkage.

The height of cut gauge 1571 can be useful when manually adjusting the height of cut of the cutting assembly 1520. An operator using a tool to change the length of variable-length member 1565 can view the gauge 1571 from above, like in the view of FIG. 15, to see the current height of cut.

In some examples, the height of cut indicator 1570 can be calibrated by adjusting the position of the gauge 1571 to correspond to the correct height of cut for a particular position of the pointer 1576. The indicator 1570 is calibrated by moving the entire gauge 1571 either forward toward the front of the cutting assembly 1520 or backward toward the back of the cutting assembly 1520. In the example of FIGS. 15-16, the gauge 1571 has a pair of tabs 1575 to attach the gauge 1571 to the top surface of the cutting unit 1530, for example with a nut and bolt. In some examples, the top surface can have elongated slots (not shown) for the nuts and bolts, where slots are elongated parallel to the elongation of the side link 1522. The slots allow the tabs 1575 to be positioned at the correct location so that the pointer 1576 is calibrated to point to the correct markings 1572 for the current height of cut.

In the example of FIGS. 15-16, the gauge 1571 is located on a top surface of the cutting unit and the pointer 1576 is attached to the four-bar linkage. In an alternative height of cut indicator, a gauge is located on a different part of the cutting assembly and markings are visible from above the cutting assembly. In another height of cut gauge example, the gauge is located on a different part of the cutting assembly and the markings are visible from a side of the cutting assembly. Also, a gauge with markings can be located on one of the cutting unit or the four-bar linkage, while a pointer that point to the markings is located on the other of the cutting unit or the four-bar linkage. In an example different from FIGS. 15-16, the gauge is located on the four-bar linkage and the pointer is located on the cutting unit.

Measuring Height of Cut and Attitude

Height of cut for a mower refers to the desired height of the turf that is being mowed, and to the height of turf where a cutting blade strikes the turf. FIGS. 11-12 show a rotary cutting assembly having a first height of cut H1 in the configuration if FIG. 11 and a second height of cut H2 in the second configuration of FIG. 12. The height of the cutting blade 1004 in relation to the reference plane 650 of the ground changes as the side link 710 moves back and forth toward the rear roller 325 or toward the front member 516 of the carrier frame 310. In the context of a rotary cutting assembly, such as shown in the Figures, the height of cut is measured between the reference plane 650 approximating the ground and a bottom surface of the cutting blade 1004 when the cutting blade 1004 is pointing forward, as shown in FIGS. 11-12. The height of cut is measured at the lowest point of the cutting blade 1004.

In some examples, the cutting blade 1004 is not parallel to the reference plane 560. In other words, the cutting blade 1004 is lower in the front than in the back. In some examples, a tilt or attitude of the cutting blade from front to back is approximately ⅛ inch to ¼ inch per foot of length of the blade 1004, or 0.31 centimeter to 0.63 centimeter per 0.3 meter of length of the blade 1004. Such an attitude of the blade allows the blade to only cut along the forward 180 degrees of rotation. This decreases the horsepower necessary to turn the blade.

The attitude of a cutting unit can be determined with respect to a reference plane defined by the rollers, such as the reference plane 650. To measure the attitude of a rotating blade in a rotary cutting unit, the blade is rotated so that one tip is pointing forward. The distance from the reference plane to the tip is measured at that point. The tip is then rotated 180 degrees and the distance from the tip to the reference plane is measured again. The difference in height is the attitude of the rotary blade. In various examples, an attitude of a rotary cutting unit 330 is about ⅛ inch (0.3 centimeter), about ¼ inch (0.6 centimeter), about ⅜ inch (0.9 centimeter), about ½ inch (1.3 centimeters), about ⅝ inch (1.6 centimeters), or about ¾ inch (1.9 centimeters).

The attitude of disc mowers can be measured in a similar manner. To measure the attitude of a disc quill, the quill is rotated so that one cutting blade is pointing forward. The distance from the reference plane to a tip of that cutting blade is measured at that position. The disc quill is then then rotated 180 degrees and the distance from the tip of the cutting blade to the reference plane is measured again. The difference in height is the attitude of the disc cutting unit.

The attitude of a mower without a rigid blade that rotates about a substantially vertical axis, such as a trimmer that uses a filament, is determined by holding the filament in an extended position pointing forward. The distance from the reference plane to a tip of the filament is measured at that position. The filament is then rotated 180 degrees and the distance from the tip of the filament to the reference plane is measured again. The difference in height is the attitude of the filament cutting unit.

Maintaining Attitude of Cutting Units Through the Range of Height of Cut

The cutting unit 330 is configured to maintain its attitude with respect to the ground reference plane 650 as the cutting unit 330 is moved from a first height of cut to a second height of cut. The shaft of the drive system 334 rotates around a substantially vertical axis with respect to the reference frame of the housing 532, and the cutting blade 1004, which is mounted on the drive system 334, follows the rotation of the shaft. The elements that make up the cutting unit 330, which include the cutting unit housing 532, the drive system 334, and the cutting blade 1004, have a fixed vertical spatial relation to each other. When the housing 532 moves a vertical distance from the reference plane 650, the cutting blade 1004 travels an equal distance, maintaining its spatial relation with the cutting unit housing 532.

Returning to FIG. 6, the arm 623, which is defined by the portion of the bell crank 620 between the pivot 624 and the pivot 626, travels in an arc as the arm 623 pivots about the pivot 624. The pivot 626, attached to the housing 532, travels a particular distance vertically with respect to the reference plane 650. The bell crank 630 also has an arm 633. The arm 633 travels in an arc as the arm 633 pivots about the pivot point 634. The vertical distance that the pivot 636 travels with respect to the reference plane 650 is equal to the vertical distance traveled by the pivot 626. This allows the cutting unit 330 to maintain its attitude with respect to the reference plane 650 on the first side 522.

Now referring to FIG. 7, on the second side 524 of the cutting assembly 120, the pivots 736, 726 also travel an equal distance vertically with respect to the reference plane 650. Thus, the cutting unit 330 maintains its attitude with respect to the reference plane 650 on the second side 524. The housing 532 is vertically displaced equally at the front portion of the cutting assembly 120 and the rear portion of the cutting assembly 120, which causes the attitude with respect to the ground reference plane 650 to remain constant. Notably, if any of the arms were to travel a greater or smaller vertical distance with respect to the reference plane 650, the cutting unit 330 would not maintain its attitude because one portion of the cutting unit 330 would be either closer to or farther from the ground reference plane 650 at the corresponding portion of the housing 532.

Alternative Example of a Height of Cut Adjustment System for a Cutting Assembly

Figure 17:
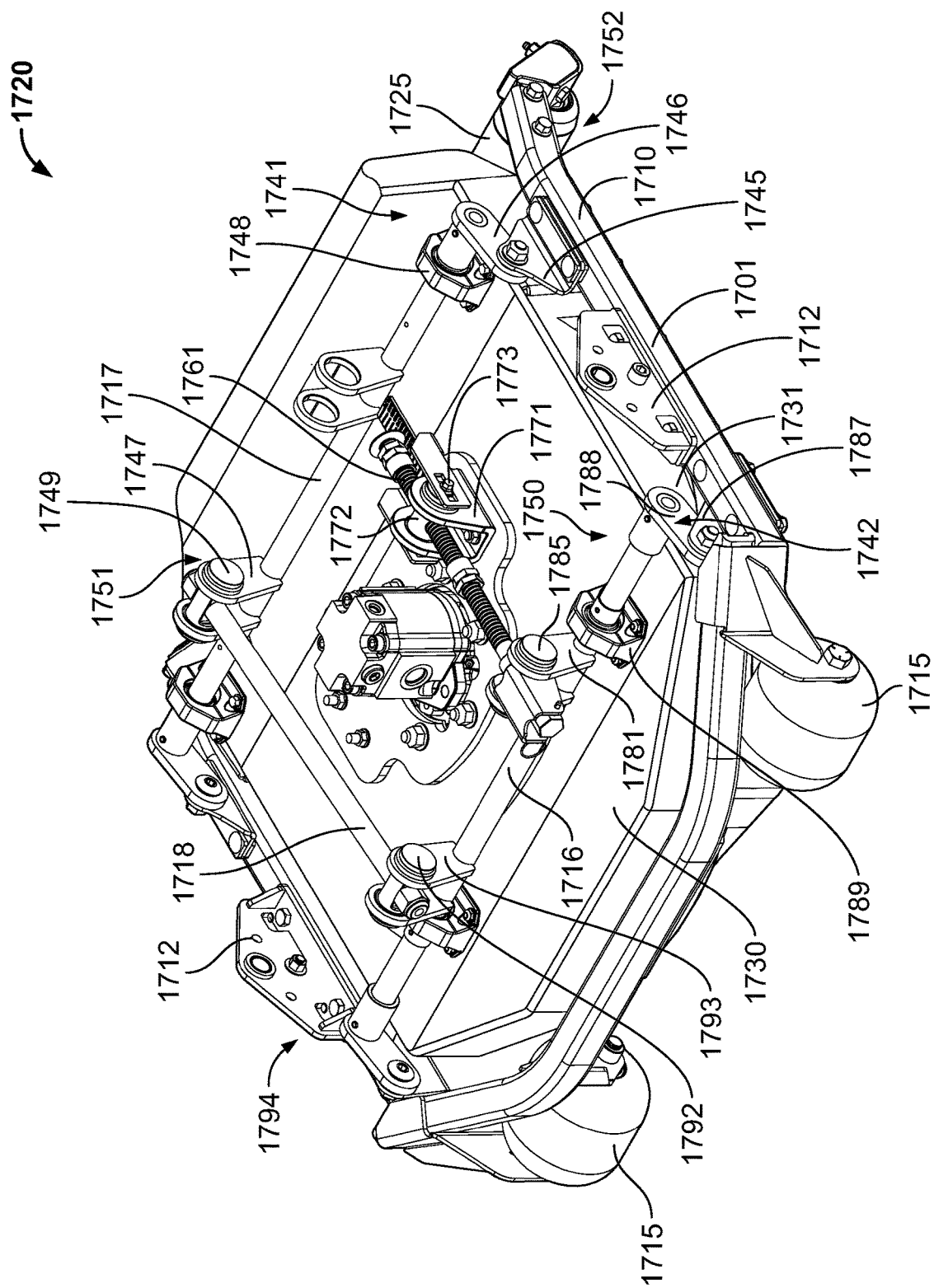
FIG. 17 is a perspective view of a cutting assembly according to some examples.
Figure 18:
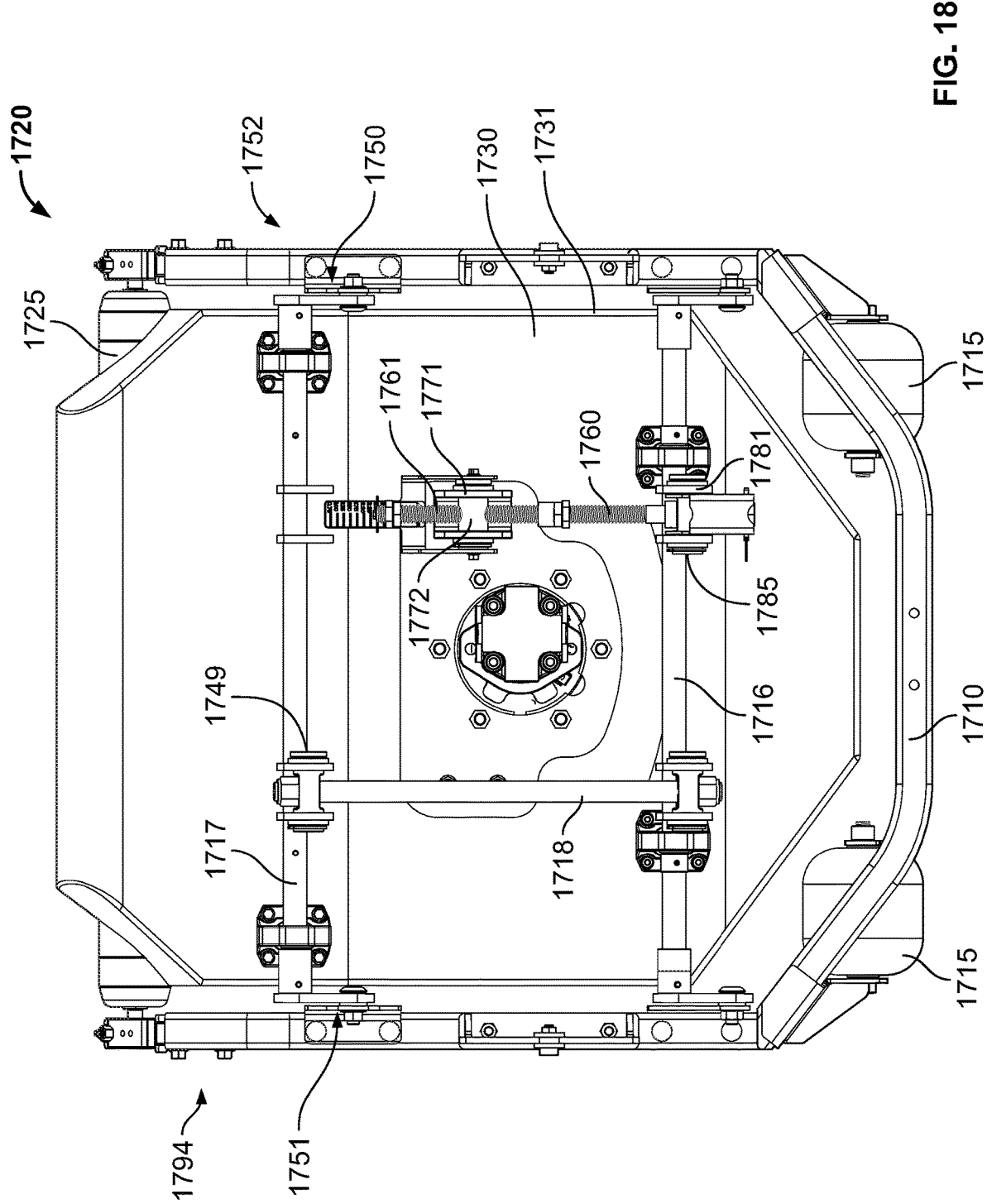
FIG. 18 is a top plan view of the example of FIG. 17.

FIGS. 17-20 show an alternative example of a cutting assembly having a height of cut adjustment system. As seen in FIG. 17, a cutting assembly 1720 includes a carrier frame 1710 with a plurality of ground engaging, rotatable members, including two front rotatable members 1715 and a rear rotatable member 1725. The carrier frame 1710 has brackets 1712 configured to couple the cutting assembly 1720 with a mower as seen in FIG. 1. The carrier frame 1710 serves as a structural support for cutting unit 1730. The cutting unit 1730 has a spatial relationship with the carrier frame 1710 such that a change in the position of cutting unit 1730 with respect to the carrier frame 1710 results in a change in the height of cut for the cutting assembly 1720.

The cutting assembly 1720 further includes at least one four-bar linkage connecting the carrier frame 1710 and the cutting unit 1730. The at least one four-bar linkage regulates the movement of the cutting unit 1730 in relation to the carrier frame 1710.

In the example of FIG. 17, the cutting assembly 1720 includes a first four-bar linkage 1750 and a second four bar linkage 1751 on opposite sides of the cutting assembly 1720. The first four-bar linkage 1750 and the second four-bar linkage 1751 are linked to a variable-length member 1760 and connected to each other by a front connector member 1716 and a rear connector member 1717. The front connector member 1716 and the rear connector member 1717 are transverse members spanning the width of the cutting assembly 1720. The variable-length member 1760 is pivotably connected to the cutting unit 1730 and to the front connector member 1716. A side link 1718 pivotably links the front connector member 716 and the rear connector member 1717.

In the example of FIG. 17, the variable-length member 1760 is a manually controlled actuator 425 that includes a threaded draw bolt 1761, like manually controlled actuator 425 described herein. A change in the length of the variable-length member 1760 causes the height of cut of the cutting assembly 1720 to change. The draw bolt 1761 is pivotably connected to a chamber-mounted trunnion 1771 that is attached to the cutting unit 1730. The threads of the draw bolt 1761 engage a washer 1772 that is attached to the trunnion 1771. Rotation of the threaded draw bolt 1761 allows the draw bolt to move horizontally through the washer 1772. The length of the variable-length member 1760 is defined between the pivot axis 1773 on the trunnion 1771 and the pivot 1785 on the crank arm 1781. Although the variable-length member 1760 is shown as a manually actuated unit, in alternative examples (not shown), the variable-length member could be an electronically controlled linear actuator.

Alternative Example of a Four-Bar Linkage

Alternative examples of a four bar linkage for a height of cut adjustment system are provided. Referring still to FIGS. 17-20, the cutting assembly 1720 comprises a first four-bar linkage 1750 on the first side 1752 of the cutting assembly 1720 and a second four-bar linkage 1751 on a second side 1794 of the cutting assembly 1720. The function of the four-bar linkages of the example of FIGS. 17-20 is similar to the other examples discussed herein, with different arm locations within the crank assemblies.

Figure 19:
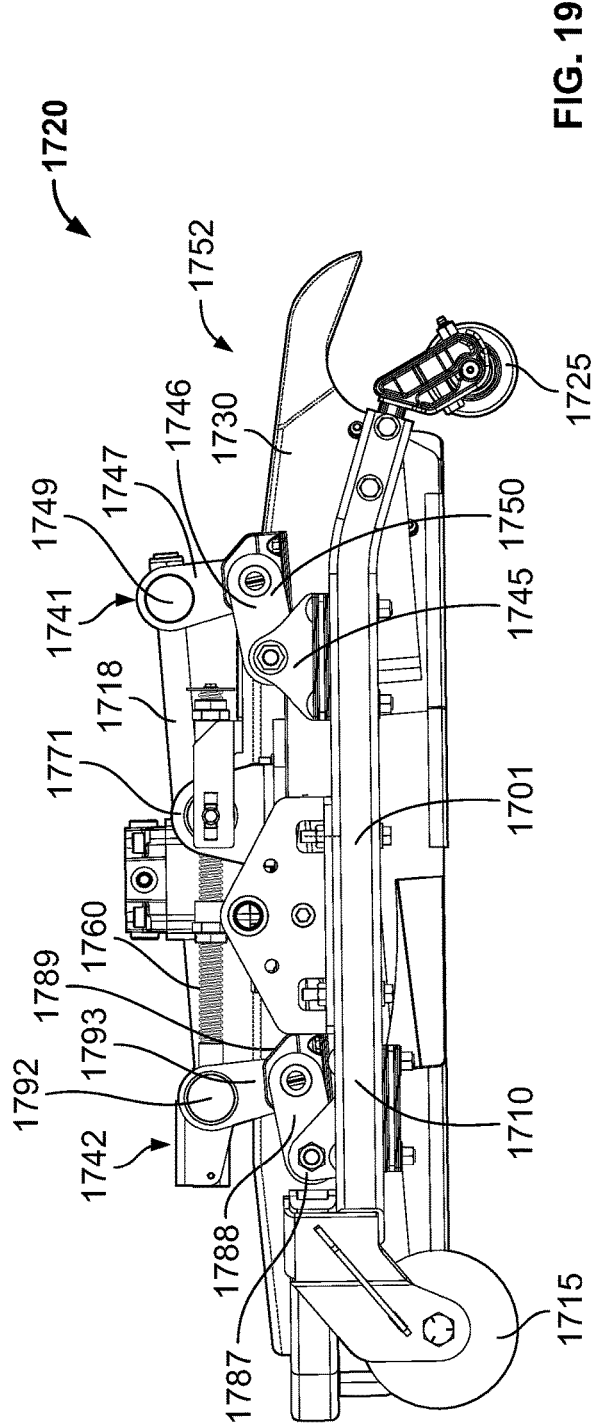
FIG. 19 is a right side elevation view of the example of FIG. 17.

The first four-bar linkage 1750 is best seen in FIGS. 17 and 19. The first four-bar linkage 1750 connects a first side member 1701 of the carrier frame 1710 to the first side 1731 of the cutting unit 1730. Specifically, the four-bar linkage 1750 includes a side link 1718 and a pair of crank assemblies 1741, 1742. The first crank assembly 1741 comprises a bracket 1745 pivotably attached to an arm 1746. The arm 1746 is attached to a rear connector member 1717, which can be a shaft, and the rear connector member 1717 is rotatable within a bearing 1748. The rear connector member 1717 further includes an arm 1747 that pivots with the rear connector member 1717. The side link 1718 is linked to the rear connector member 1717 by the arm 1747 at a pivot 1749.

The second crank assembly 1742 comprises a bracket 1787 pivotably attached to an arm 1788. The arm 1788 is attached to the front connector member 1716, which can be a shaft, and the front connector member 1716 is rotatable within a bearing 1789. The front connector member 1716 further includes an arm 1781 that pivots with the front connector member 1716. The side link 1718 is linked to the front connector member 1716 by the arm 1781 at a pivot 1785. Each of the crank assemblies is pivotably attached to the carrier frame 1710 at a point that is fixed with respect to the remainder of the carrier frame. Each of the crank assemblies is also pivotably attached to the cutting unit 1730 and the side link 1718, and rotation of the crank assembly causes those two attachments to move in space relative to the carrier frame 1710. The side link 1718 and the first crank assembly 1741 are pivotably attached at point 1749; the carrier frame 1710 and the first crank assembly 1741 are pivotably attached by bracket 1745; and the cutting unit 1730 is pivotably attached to the first crank assembly 1741 at bearing 1748 and a similar bearing on the second side of the cutting assembly 1720. Likewise, the side link 1718 and the second crank assembly 1742, which has an arm 1793, are pivotably attached at pivot 1792; the carrier frame 1710 and the second crank assembly 1742 are pivotably attached at bracket 1787; and the cutting unit 1730 is pivotably attached to the second crank assembly 1742 at bearing 1789.

The connections at the different pivot points allow the parts to rotate with respect to each other without significant friction. Examples of pivoting connection structures include a bolt and nut arrangement with bushings in between each component. Other mechanical configurations are possible, such as low friction washers in combination with a bolt and nut.

The crank assemblies, including the first crank assembly 1741 and the second crank assembly 1742, act as levers that transform the substantially horizontal motion of the side link 1718 to substantially vertical motion of the cutting unit. The mechanical linkage of the first and second four-bar linkage assemblies 1750, 1751 constrains the side link 1718 to substantially horizontal movement in a plane parallel to the side 1753 of the cutting assembly 1720. Substantially horizontal motion of the side link 1781 causes the arm 1747 and the arm 1793 to rotate about their pivot points 1749, 1792, respectively, where the first crank assembly 1741 and second crank assembly 1742 are pivotably attached to the carrier frame 1710, respectively. This motion further causes the cutting unit 1730 to be lowered or raised substantially vertically in relation to the carrier frame 1710. This substantially vertical displacement of the cutting unit 1730 causes the blade of the cutting unit 1730 to likewise be lowered or raised, which changes the distance of the cutting blade from a reference plane, and therefore the height of cut.

The length of each of the arms 1746, 1747, 1788, 1793 defines the arc along which the first and second crank assemblies 1741, 1742 travel. In some examples, the length of each of the crank assembly arms is at least 2 inches (5.1 centimeters). In some examples, the length of the arms is between two inches and five inches, or between 5.1 and 12.7 centimeters. In some examples, the length is more than two inches (5.1 centimeters), more than 2.5 inches (6.4 centimeters), more than 3 inches (7.6 centimeters), or more than 3.5 inches (8.9 centimeters). In some examples, the length is less than 6 inches (15.2 centimeters), less than 5 inches (12.7 centimeters), or less than 4 inches (10.2 centimeters). In some examples, the first arm and the second arm have different lengths. In some examples, the crank assemblies 1741, 1742 are identical in size and shape.

Figure 20:
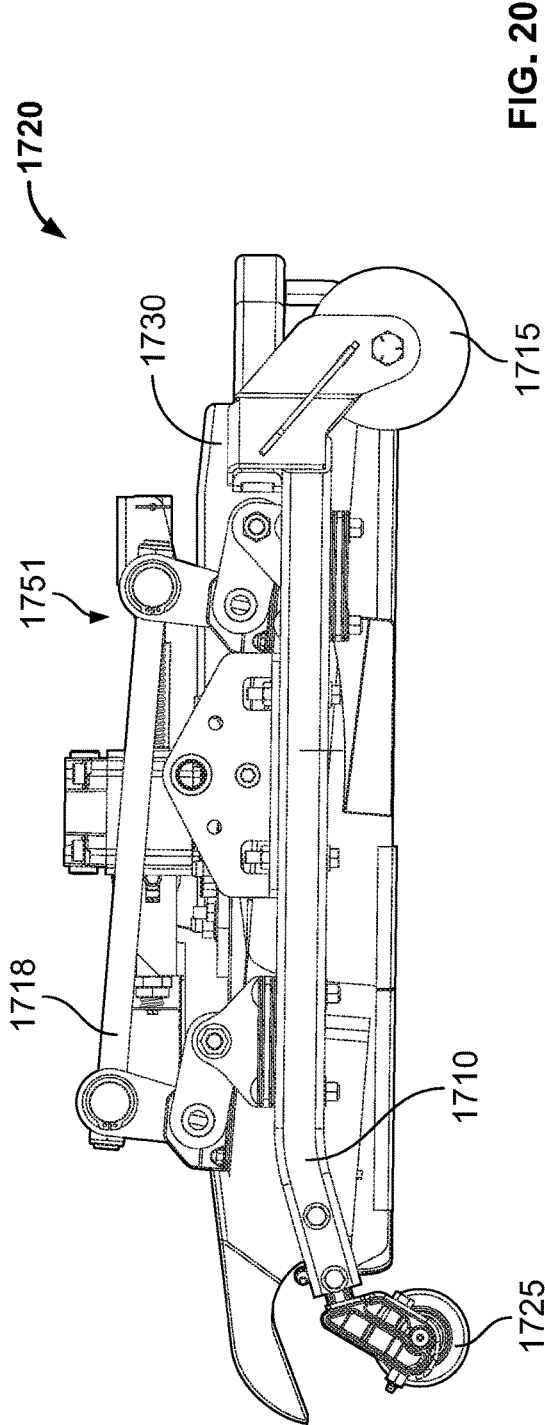
FIG. 20 is a left side elevation view of the example of FIG. 17.

FIG. 20 shows the second side 1794 of the cutting assembly 1720, which includes a second four-bar linkage 1751. Most of the components and component locations of the second four-bar linkage are mirror images of the components and component locations of the first four-bar linkage 1750.

Automatic Height of Cut Control System

Figure 13:
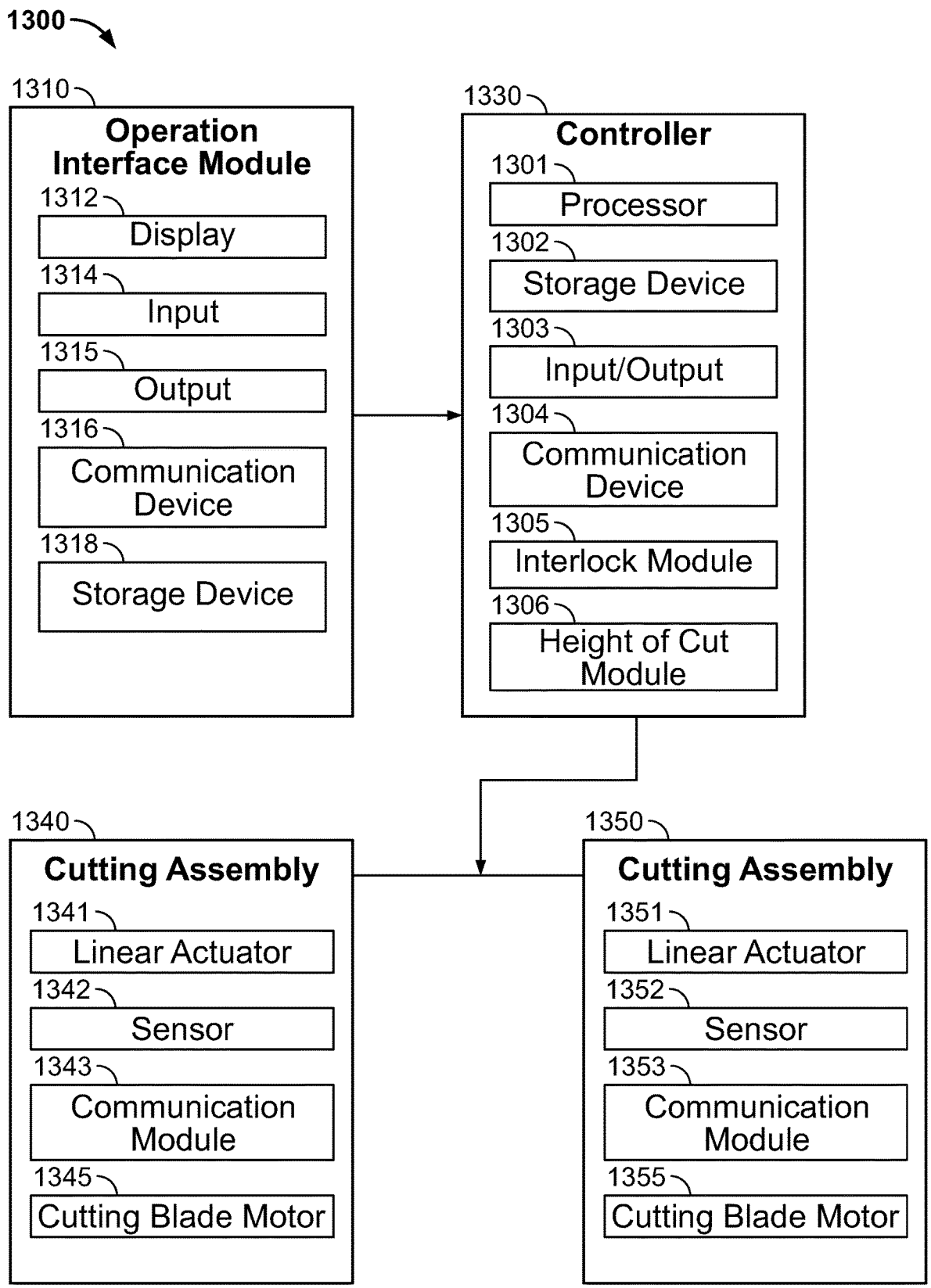
FIG. 13 is a block diagram for an automatic height of cut control system.

FIG. 13 is a block diagram for an automatic height of cut control system. The system 1300 includes a main controller 1330 connected to an operator interface module 1310 and a plurality of cutting assemblies 1340, 1350. The operator interface module 1310 includes a display 1312. The display 1312 may include, for example, an electronic screen with a graphical user interface, such as a liquid crystal display. An operator of the system uses one or more input devices 1314 to indicate a target height of cut for the cutting blades. The display 1312 may, for example, then display the height of cut selected by the operator. The target height of cut selected can be provided as output by output device 1315. A communication device 1316 relays the output, such as target height of cut, to the controller 1330. The operator interface module 1310 also includes a storage device 1318. In one example, the main controller includes a display and serves the functions of the operator interface module.

The display 1312 can be implemented in a number of different ways. In some examples, the display 1312 is an electronic display screen. In other examples, the display 1312 could simply be a printed, static graphic image on a control panel. Options for the input device 1314 include buttons that control selections on the display 1312, or a touchscreen, or could be as simple as a dial or multiple buttons that each indicate a different height of cut. Alternatively, the operator interface module 1310 could be implemented on an external device such as a smartphone or tablet computer capable of communicating with the controller 1330.

The controller 1330 includes a processor 1301, a storage device 1302, one or more input and output devices 1303, and a communication device 1304. The controller may include software modules that program the controller to perform certain functions. These include but are not limited to an interlock module 1305 and a height of cut module 1306. These will be described further in relation to FIG. 14.

The controller 1330 sends control signals to a plurality of cutting assemblies 1340, 1350. In the drawing of FIG. 13, the cutting assembly 1340 is depicted with its internal components. Cutting assembly 1350 is provided with substantially similar components as the cutting assembly 1340, however, the plurality of cutting assemblies need not all be identical. Although just two cutting assemblies are depicted in FIG. 13, configurations containing more than two cutting assemblies are contemplated and within the scope of the described technology.

The cutting assembly 1340 includes a height-of-cut sensor 1342 that senses information related to the height of cut. The height-of-cut sensor 1342 may be, for example, a potentiometer such as a linear or rotational potentiometer that is incorporated into the linear actuator or elsewhere in the cutting assembly, or one of the other options described herein. As described above, the cutting assembly could include other types of sensors in various embodiments. The sensor 1342 may directly measure the height of cut, or may indirectly measure the height of cut, for example, measuring the amount of extension of the linear actuator 1341, or measuring an amount of rotation of a crank assembly in a four-bar linkage. Other types of sensors, and other methods of sensing, are within the scope of the described technology.

Cutting assembly 1340 includes a communication module 1343 that receives control signals from the controller 1330 and sends height-of-cut information to the controller 1330 from the height-of-cut sensor 1342 or other sensors. The cutting assembly 1340 includes circuitry for controlling the linear actuator 1341 to cause the linear actuator 1341 to extend or retract, thus changing its length. The controller 1330 can further send signals to the cutting assembly 1340 to activate the cutting blade drive system 1345 or deactivate the cutting blade drive system 1345.

Method of Automatic Height of Cut Control

FIG. 14 is a flowchart demonstrating a method for the automatic height of cut control system. In step 1401, the control system receives at least one target height of cut. In various embodiments, the target height of cut is input by the operator to the operator interface module and provided to the controller. The target height of cut may be identical for all of the cutting assemblies. In some examples, the target height of cut is different for different cutting assemblies, in which case more than one target height of cut would be received.

In step 1402, the control system optionally engages a cutting interlock. The cutting interlock module (shown in FIG. 13) prevents the cutting blade drive system from operating until each of the plurality of cutting assemblies reaches the target height of cut. In alternative examples, the cutting interlock can be omitted.

In step 1403, the control system sends the target height or heights of cut to a plurality of cutting assemblies. The example of FIG. 14 demonstrates a flow chart for two cutting assemblies receiving height of cut information; however, more than two cutting assemblies can be included. At step 1404, each of the plurality of cutting assemblies receives a command to change the current height of cut to the received target height of cut. In response, each cutting assembly causes a cutting unit of the cutting assembly to move to the target height of cut. The cutting assemblies may receive that signal from the controller at substantially the same time. In one example, a plurality of the cutting assemblies move to the target height of cut at approximately the same time; in other examples, the cutting assemblies could move sequentially. The cutting units need not be synchronized in this respect. Alternatives are possible and within the scope of the disclosed technology.

At steps 1405, 1407, the height of cut is checked for each individual cutting assembly to determine whether the target height of cut has been reached. This can be implemented in a number of different ways. For example, height-of-cut sensors on each of the cutting assemblies can provide information correlated to the height of cut to the control system, which the control system can use to calculate the height of cut. For example, sensors could relay information about the amount of extension of a linear actuator, or a degree of rotation of a crank assembly such as bell crank. In alternative examples, the height of cut can be measured directly and relayed to the control system. If the target height of cut is not yet reached, the control system can provide a command at steps 1408, 1409 to change the height of cut. After this step, the method would again progress to check whether the target height of cut has been reached for each cutting assembly. This process is iterated until each cutting assembly has reached the target height of cut.

In alternative examples, the control system can send the target height of cut to each cutting assembly, then passively wait for a response from each of the cutting assemblies indicating that the target height of cut has been reached.

At step 1420, the control system receives a signal from all cutting assemblies, indicating that each of the individual cutting assemblies has reached the target height of cut for that cutting assembly. In response, the control system disengages the cutting interlock at step 1430, allowing the cutting drive system to function.

Although the technology herein has been described with particular reference to the Figures, alternative implementations are possible, and are within the scope of the claimed technology. For example, the linear actuator could be replaced with another mechanical assembly to drive rotation of the crank assemblies such as bell cranks. The crank assemblies could be rotated by a pinion and sector gear in combination with a worm gear at one or both sides of the carrier frame. In alternative examples, one or more eccentric cams could be used to lift and lower the cutting unit to change the height of cut. Alternatively, a substantially vertical screw system mounted to the frame could replace the four-bar linkages. The screw system could be used to vertically lift and lower the deck with respect to the frame while maintaining the attitude of the cutting unit.

It should be noted that, as used in this specification and the appended claims, the singular forms include the plural unless the context clearly dictates otherwise. It should also be noted that the term "or" is generally employed in its sense including "and/or" unless the content clearly dictates otherwise.

All publications and patent applications referenced in this specification are herein incorporated by reference in their entirety.

The invention has been described with reference to various specific and preferred embodiments and techniques. However, it should be understood that many variations and modifications may be made while remaining within the spirit and scope of the invention.

What is claimed is:

1. A mower comprising:
    a vehicle;
    a plurality of cutting assemblies operably connected to the vehicle and capable of being driven by the vehicle, each cutting assembly comprising:
        a carrier frame having a plurality of ground-engaging rotatable members including at least one front rotatable member and at least one rear rotatable member configured to follow a ground surface, wherein the plurality of ground-engaging rotatable members of each carrier frame define a reference plane of the carrier frame;
        a cutting unit connected to the carrier frame, wherein the cutting unit has an attitude with respect to the reference plane of the carrier frame, the cutting unit having at least one cutting blade,
        a first four-bar linkage connecting a first side of the cutting unit to a first side of the carrier frame,
        a second four-bar linkage connecting a second side of the cutting unit to a second side of the carrier frame,
        a connector member linking the first four-bar linkage to the second four-bar linkage; and
        a manually-driven, variable-length member having a first end linked to a top surface of the cutting unit between a center of the cutting unit and one of the first and second sides of the cutting unit and a second end linked to the connector member between a center of the connector member and an end of the connector member, each manually-driven, variable-length member configurable to cause movement of the cutting unit in relation to the carrier frame in response to a change in length of the manually-driven, variable-length member;
    wherein the manually-driven, variable-length member of each cutting assembly is capable of moving each of the cutting units with respect to each respective carrier frame to move the cutting units from a first height of cut to a second height of cut; and
    wherein each cutting unit is configured to maintain the attitude with respect to the reference plane of each respective carrier frame as the cutting unit is moved from the first height of cut to the second height of cut.

2. The mower of claim 1, wherein each of the ground-engaging rotatable members are independent of the vehicle.

3. The mower of claim 1, wherein the first four-bar linkage and the second four-bar linkage each comprise:
    a side link; and
    a first crank assembly and a second crank assembly, each crank assembly having:
    a pivot attached to the carrier frame,
    a first arm pivotably connected to the cutting unit, and
    a second arm pivotably connected to the side link.

4. The mower of claim 1, wherein the first four-bar linkage and the second four-bar linkage each comprise a first crank assembly and a second crank assembly, a first end of the connector member attached to one of first crank assembly and the second crank assembly of the first four-bar linkage, and a second end of the connector member attached to one of the first crank assembly and the second crank assembly of the second four-bar linkage.

5. The mower of claim 1, further comprising a height of cut indicator comprising:
    a gauge located on the cutting unit, the gauge comprising markings indicating a plurality of heights of cut of the cutting unit; and
    an indicator member configured to move with respect to the gauge as the first and second four-bar linkages move in relation to the cutting unit, wherein the indicator member indicates a height of cut position of the cutting unit.

6. The mower of claim 1, wherein the manually-driven variable-length member comprises a draw bolt that can be rotated to extend and retract the manually-driven, variable-length member.

7. The mower of claim 1, further comprising a height of cut gauge positioned on a top surface of each cutting assembly and configured such that an operator can view the height of cut gauge from above.

8. The mower of claim 1, wherein the cutting blade is not parallel to the reference plane.

9. The mower of claim 1, wherein a front portion of the cutting blade is lower than a back portion of the cutting blade relative to the reference plane.

10. The mower of claim 1, wherein the first end of the manually-driven, variable-length member is secured to a first opening in a top surface of the cutting unit, wherein the first opening is located between a center of the cutting unit and one of the first and second sides of the cutting unit.

11. The mower of claim 1, wherein the cutting unit further comprises a first opening and a second opening, wherein each of the first and second openings is configured to facilitate attachment of the first end of the manually-driven, variable-length member such that the first end of the manually-driven, variable-length member is configured to link to the cutting unit at either one of first opening and the second opening, providing a first attachment location and an alternate second attachment location for the manually-driven, variable-length member.

12. The mower of claim 11, the connector member comprising a first bracket between the first side and the center of the cutting unit and a second bracket between the second side and the center of the cutting unit, the first bracket and second bracket configured to attach to the second end of the manually-driven, variable-length member to provide alternate attachment points, wherein the first bracket attaches to the second end of the manually-driven, variable-length member in the first attachment location and wherein the second bracket attaches to the second end of the manually-driven, variable-length member in the alternate second attachment location.

13. The mower of claim 12, the first bracket and second bracket configured to pivotally connect the second end of the manually-driven, variable-length member to the connector member.

14. The mower of claim 1, the manually-driven, variable-length member comprises a threaded draw bolt, wherein the threaded draw bolt is pivotably connected to a trunnion attached to the cutting unit;
wherein threads of the threaded draw bolt are configured to engage a washer of the trunnion such that rotation of the threaded draw bolt causes the threaded draw bolt to move horizontally through the washer.

15. A mower system comprising:
a vehicle;
a plurality of cutting assemblies operably connected to the vehicle and capable of being driven by the vehicle, each cutting assembly comprising:
a carrier frame having a plurality of ground-engaging rotatable members including at least one front rotatable member and at least one rear rotatable member configured to follow a ground surface, wherein the plurality of ground-engaging rotatable members of each carrier frame define a reference plane of the carrier frame;
a cutting unit connected to the carrier frame, wherein the cutting unit has an attitude with respect to the reference plane of the carrier frame, the cutting unit having at least one cutting blade,
a first four-bar linkage connecting a first side of the cutting unit to a first side of the carrier frame,
a second four-bar linkage connecting a second side of the cutting unit to a second side of the carrier frame,
a connector member linking the first four-bar linkage to the second four-bar linkage; and
a manually-driven, variable-length member configured to be removably attached to the cutting assembly, having a first end linked to a top surface of the cutting unit between a center of the cutting unit and one of the first and second sides of the cutting unit and a second end linked to the connector member between a center of the connector member and an end of the connector member, each manually-driven, variable-length member configurable to cause movement of the cutting unit in relation to the carrier frame in response to a change in length of the manually-driven, variable-length member;
an automatically-actuated, variable-length member configured to be removably attached to the cutting assembly comprising an operator interface module operably connected to the automatically-actuated, variable-length member and configured to cause the automatically-actuated, variable-length member to automatically move each of the cutting units with respect to each respective carrier frame based on operator input,
wherein the mower can be converted between manual actuation and automatic actuation when the manually-driven, variable-length member is replaced by the automatically-actuated, variable-length member;
wherein the manually-driven, variable-length member of each cutting assembly is capable of moving each of the cutting units with respect to each respective carrier frame to move the cutting units from a first height of cut to a second height of cut;
wherein the automatically-actuated, variable-length member of each cutting assembly is capable of moving each of the cutting units with respect to each respective carrier frame to move the cutting units from a first height of cut to a second height of cut;
wherein each cutting unit is configured to maintain the attitude with respect to the reference plane of each respective carrier frame as the cutting unit is moved from the first height of cut to the second height of cut.

* * * * *